(12) United States Patent
He

(10) Patent No.: US 11,812,406 B2
(45) Date of Patent: Nov. 7, 2023

(54) TECHNIQUES FOR REDUCING FALSE PAGING RECEPTION

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/175,382

(22) Filed: Feb. 12, 2021

(65) Prior Publication Data

US 2021/0258916 A1   Aug. 19, 2021

Related U.S. Application Data

(60) Provisional application No. 62/976,973, filed on Feb. 14, 2020.

(51) Int. Cl.
*H04W 4/00* (2018.01)
*H04W 68/00* (2009.01)
(Continued)

(52) U.S. Cl.
CPC ..... *H04W 68/005* (2013.01); *H04W 52/0225* (2013.01); *H04W 72/23* (2023.01)

(58) Field of Classification Search
None
See application file for complete search history.

(56) References Cited

U.S. PATENT DOCUMENTS 11,206,635 B2 * 12/2021 Huang ............... H04W 72/042
2016/0112985 A1 * 4/2016 Cui .................. H04W 28/0284
455/458

(Continued)

FOREIGN PATENT DOCUMENTS

WO   WO-2018144873 A1   8/2018
WO   WO-2019154090 A1   8/2019

OTHER PUBLICATIONS

Huawei et al., "Finalization of NR Paging", 3GPP Draft, 3GPP TSG RAN WG1 Meeting #91, R1-1719373, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017 Nov. 18, 2017 (Nov. 18, 2017), XP051369282, 7 Pages, Retrieved from the Internet: URL:http://www.3gpp.org/ftp/tsg%5Fran/WG1%5FRL1/TSGR1%5F91/Docs/ [retrieved on Nov. 18, 2017], paragraph [82 .1], figure 2 paragraph [82. 4].

(Continued)

*Primary Examiner* — Zewdu A Beyen
(74) *Attorney, Agent, or Firm* — Norton Rose Fulbright US LLP

(57) ABSTRACT

This disclosure provides systems, methods, and devices for wireless communication that support a reduction in false positive paging. In some implementations, a method of wireless communication includes receiving, at a user equipment (UE) from a base station, a paging downlink control information (DCI). The paging DCI message is encoded to indicate an addressee of a paging message or indicates one or more UEs or a location of radio resources of the paging message in a time dimension, a frequency dimension, or both. The method also includes determining, at the UE, whether the paging message is addressed to the UE based on: an encoding of the paging DCI message, whether the one or more UEs include the UE, or the location of the radio resources of the paging message in the time dimension, the frequency dimension, or both. Other aspects and features are also claimed and described.

30 Claims, 11 Drawing Sheets

(51) Int. Cl.
*H04W 52/02* (2009.01)
*H04W 72/23* (2023.01)

(56) References Cited

U.S. PATENT DOCUMENTS

2020/0163048 A1* 5/2020 Kim ...................... H04W 72/12
2021/0105739 A1* 4/2021 Lin ...................... H04L 5/0053
2021/0168759 A1* 6/2021 Pan ...................... H04W 68/02

OTHER PUBLICATIONS

International Search Report and Written Opinion—PCT/US2021/018056—ISA/EPO—dated May 11, 2021 (202070WO).

* cited by examiner

TECHNIQUES FOR REDUCING FALSE PAGING RECEPTION

CROSS-REFERENCE TO RELATED APPLICATIONS

This application claims the benefit of U.S. Provisional Patent Application No. 62/976,973, entitled, "TECHNIQUES FOR REDUCING FALSE PAGING RECEPTION," filed on Feb. 14, 2020, which is expressly incorporated by reference herein in its entirety.

TECHNICAL FIELD

Aspects of the present disclosure relate generally to wireless communication systems, and more particularly, to wireless communication systems that reduce false paging reception. Certain aspects of the technology discussed below may enable and provide reduced false paging reception, which may reduce power consumption at devices of the wireless communication systems.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

In some wireless communication systems, devices such as UEs may enter a radio resource control (RRC) idle/inactive mode (e.g., a low power operating mode) in order to reduce power consumption while data is not being communicated by the UEs. Each UE may "wake up" (e.g., power on one or more components) during a corresponding paging opportunity (PO) during a discontinuous reception (DRX) cycle and, if no indication of a paging message is received during the PO, the UE returns to the low power operating mode for the remainder of the DRX cycle to reduce power consumption. One technique for reducing paging load is to assign UEs to different groups, each group having its own paging opportunity. Assignment to a group is based on an identifier that uniquely identifies the UE in a wireless network and a paging frame offset.

A page typically includes two messages, a paging downlink control information (DCI) message and a paging message. The paging DCI message is transmitted over a physical downlink control channel (PDCCH) and is addressed to a paging radio network temporary identifier (P-RNTI), which is shared by all UEs in the wireless network. The paging DCI message includes the resource location of the paging message. There is no indication in the paging DCI message of which UE the paging message is addressed to, so all UEs that receive the paging DCI message power on one or more additional components (e.g., portions of modems, receivers, etc.) to receive the paging message. The paging message is transmitted via a physical downlink shared channel (PDSCH) and contains information such as identifiers of which UEs the paging message is addressed to. Thus, each UE in a PO group powers on one or more components (or portions thereof) to receive the paging message, even if some of the UEs are not recipients of the paging message. Decoding a paging message that a UE is not a recipient of (e.g., that the paging message is not addressed to) may be called a false paging reception.

Although power consumption due to false paging reception may be small in some UEs, such as typical mobile phones, in reduced-capability UEs, such as wireless sensors, power consumption due to false paging reception is more significant. Additionally, it is expected that in some 5th generation (5G) standards, including those related to reduced capability UEs, that paging repetition will increase significantly. Thus, power consumption due to false paging reception may become a significant problem in at least some situations.

BRIEF SUMMARY OF SOME ASPECTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes selecting, at a user equipment (UE), a first paging radio network temporary identifier (P-RNTI) from a plurality of available P-RNTIs. The method further includes performing a decoding operation on a paging downlink control information (DCI) message using the first P-RNTI.

In an additional aspect of the disclosure, an apparatus configured for wireless communication is disclosed. The apparatus includes at least one processor, and a memory coupled to the at least one processor. The at least one processor is configured to select, at a user equipment (UE), a first paging radio network temporary identifier (P-RNTI) from a plurality of available P-RNTIs. The at least one processor is further configured to perform a decoding operation on a paging downlink control information (DCI) message using the first P-RNTI.

In an additional aspect of the disclosure, an apparatus configured for wireless communication is disclosed. The apparatus includes means for selecting, at a user equipment (UE), a first paging radio network temporary identifier (P-RNTI) from a plurality of available P-RNTIs. The apparatus further includes means for performing a decoding operation on a paging downlink control information (DCI) message using the first P-RNTI.

In an additional aspect of the disclosure, a non-transitory computer-readable medium stores instructions that, when executed by a processor, cause the processor to perform operations including selecting, at a user equipment (UE), a first paging radio network temporary identifier (P-RNTI) from a plurality of available P-RNTIs. The operations further include performing a decoding operation on a paging downlink control information (DCI) message using the first P-RNTI.

In an additional aspect of the disclosure, a method of wireless communication includes generating, at a base station, a system information block (SIB) that includes a plurality of paging radio network temporary identifiers (P-RNTIs) supported by a wireless network. The method further includes transmitting, from the base station to a user equipment (UE), the SIB.

In an additional aspect of the disclosure, an apparatus configured for wireless communication is disclosed. The apparatus includes at least one processor, and a memory coupled to the at least one processor. The at least one processor is configured to generate, at a base station, a system information block (SIB) that includes a plurality of paging radio network temporary identifiers (P-RNTIs) supported by a wireless network. The at least one processor is further configured to initiate transmission, from the base station to a user equipment (UE), of the SIB.

In an additional aspect of the disclosure, an apparatus configured for wireless communication is disclosed. The apparatus includes means for generating, at a base station, a system information block (SIB) that includes a plurality of paging radio network temporary identifiers (P-RNTIs) supported by a wireless network. The apparatus further includes means for transmitting, from the base station to a user equipment (UE), the SIB.

In an additional aspect of the disclosure, a non-transitory computer-readable medium stores instructions that, when executed by a processor, cause the processor to perform operations including generating, at a base station, a system information block (SIB) that includes a plurality of paging radio network temporary identifiers (P-RNTIs) supported by a wireless network. The operations further include initiating transmission, from the base station to a user equipment (UE), of the SIB.

In an additional aspect of the disclosure, a method of wireless communication includes receiving, at a user equipment (UE) from a base station, a paging downlink control information (DCI) message that includes an indicator corresponding to one or more UEs and a paging message. The method further includes determining, at the UE, whether the indicator corresponds to the UE.

In an additional aspect of the disclosure, an apparatus configured for wireless communication is disclosed. The apparatus includes at least one processor, and a memory coupled to the at least one processor. The at least one processor is configured to receive, at a user equipment (UE) from a base station, a paging downlink control information (DCI) message that includes an indicator corresponding to one or more UEs and a paging message. The at least one processor is further configured to determine, at the UE, whether the indicator corresponds to the UE.

In an additional aspect of the disclosure, an apparatus configured for wireless communication is disclosed. The apparatus includes means for receiving, at a user equipment (UE) from a base station, a paging downlink control information (DCI) message that includes an indicator corresponding to one or more UEs and a paging message. The apparatus further includes means for determining, at the UE, whether the indicator corresponds to the UE.

In an additional aspect of the disclosure, a non-transitory computer-readable medium stores instructions that, when executed by a processor, cause the processor to perform operations including receiving, at a user equipment (UE) from a base station, a paging downlink control information (DCI) message that includes an indicator corresponding to one or more UEs and a paging message. The operations further include determining, at the UE, whether the indicator corresponds to the UE.

In an additional aspect of the disclosure, a method of wireless communication includes generating, at a base station, a paging downlink control information (DCI) message that includes an indicator corresponding to one or more user equipments (UEs) and a paging message. The method further includes transmitting the paging DCI message to a UE.

In an additional aspect of the disclosure, an apparatus configured for wireless communication is disclosed. The apparatus includes at least one processor, and a memory coupled to the at least one processor. The at least one processor is configured to generate, at a base station, a paging downlink control information (DCI) message that includes an indicator corresponding to one or more user equipments (UEs) and a paging message. The at least one processor is further configured to initiate transmission of the paging DCI message to a UE.

In an additional aspect of the disclosure, an apparatus configured for wireless communication is disclosed. The apparatus includes means for generating, at a base station, a paging downlink control information (DCI) message that includes an indicator corresponding to one or more user equipments (UEs) and a paging message. The apparatus further includes means for transmitting the paging DCI message to a UE.

In an additional aspect of the disclosure, a non-transitory computer-readable medium stores instructions that, when executed by a processor, cause the processor to perform operations including generating, at a base station, a paging downlink control information (DCI) message that includes an indicator corresponding to one or more user equipments (UEs) and a paging message. The operations further include initiating transmission of the paging DCI message to a UE.

In an additional aspect of the disclosure, a method of wireless communication includes receiving, at a user equipment (UE) from a base station, a paging downlink control information (DCI) message that indicates a location of radio resources of a paging message in a time dimension, a frequency dimension, or both. The method further includes determining, at the UE, whether the paging message is addressed to the UE based on the location of the radio resources of the paging message in the time dimension, the frequency dimension, or both.

In an additional aspect of the disclosure, an apparatus configured for wireless communication is disclosed. The apparatus includes at least one processor, and a memory coupled to the at least one processor. The at least one processor is configured to receive, at a user equipment (UE) from a base station, a paging downlink control information (DCI) message that indicates a location of radio resources of a paging message in a time dimension, a frequency dimension, or both. The at least one processor is further configured to determine, at the UE, whether the paging message is addressed to the UE based on the location of the radio resources of the paging message in the time dimension, the frequency dimension, or both.

In an additional aspect of the disclosure, an apparatus configured for wireless communication is disclosed. The apparatus includes means for receiving, at a user equipment (UE) from a base station, a paging downlink control information (DCI) message that indicates a location of radio resources of a paging message in a time dimension, a frequency dimension, or both. The apparatus further includes means for determining, at the UE, whether the paging message is addressed to the UE based on the location of the radio resources of the paging message in the time dimension, the frequency dimension, or both.

In an additional aspect of the disclosure, a non-transitory computer-readable medium stores instructions that, when executed by a processor, cause the processor to perform operations including receiving, at a user equipment (UE) from a base station, a paging downlink control information (DCI) message that indicates a location of radio resources of a paging message in a time dimension, a frequency dimension, or both. The operations further include determining, at the UE, whether the paging message is addressed to the UE based on the location of the radio resources of the paging message in the time dimension, the frequency dimension, or both.

In an additional aspect of the disclosure, a method of wireless communication includes generating, at a base station, a paging downlink control information (DCI) message that indicates a location of radio resources of a paging message in a time dimension, a frequency dimension, or both. The method further includes transmitting, from the base station to a user equipment (UE), the paging DCI message.

In an additional aspect of the disclosure, an apparatus configured for wireless communication is disclosed. The apparatus includes at least one processor, and a memory coupled to the at least one processor. The at least one processor is configured to generate, at a base station, a paging downlink control information (DCI) message that indicates a location of radio resources of a paging message in a time dimension, a frequency dimension, or both. The at least one processor is further configured to initiate transmission, from the base station to a user equipment (UE), of the paging DCI message.

In an additional aspect of the disclosure, an apparatus configured for wireless communication is disclosed. The apparatus includes means for generating, at a base station, a paging downlink control information (DCI) message that indicates a location of radio resources of a paging message in a time dimension, a frequency dimension, or both. The apparatus further includes means for transmitting, from the base station to a user equipment (UE), the paging DCI message.

In an additional aspect of the disclosure, a non-transitory computer-readable medium stores instructions that, when executed by a processor, cause the processor to perform operations including generating, at a base station, a paging downlink control information (DCI) message that indicates a location of radio resources of a paging message in a time dimension, a frequency dimension, or both. The operations further include initiating transmission, from the base station to a user equipment (UE), of the paging DCI message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
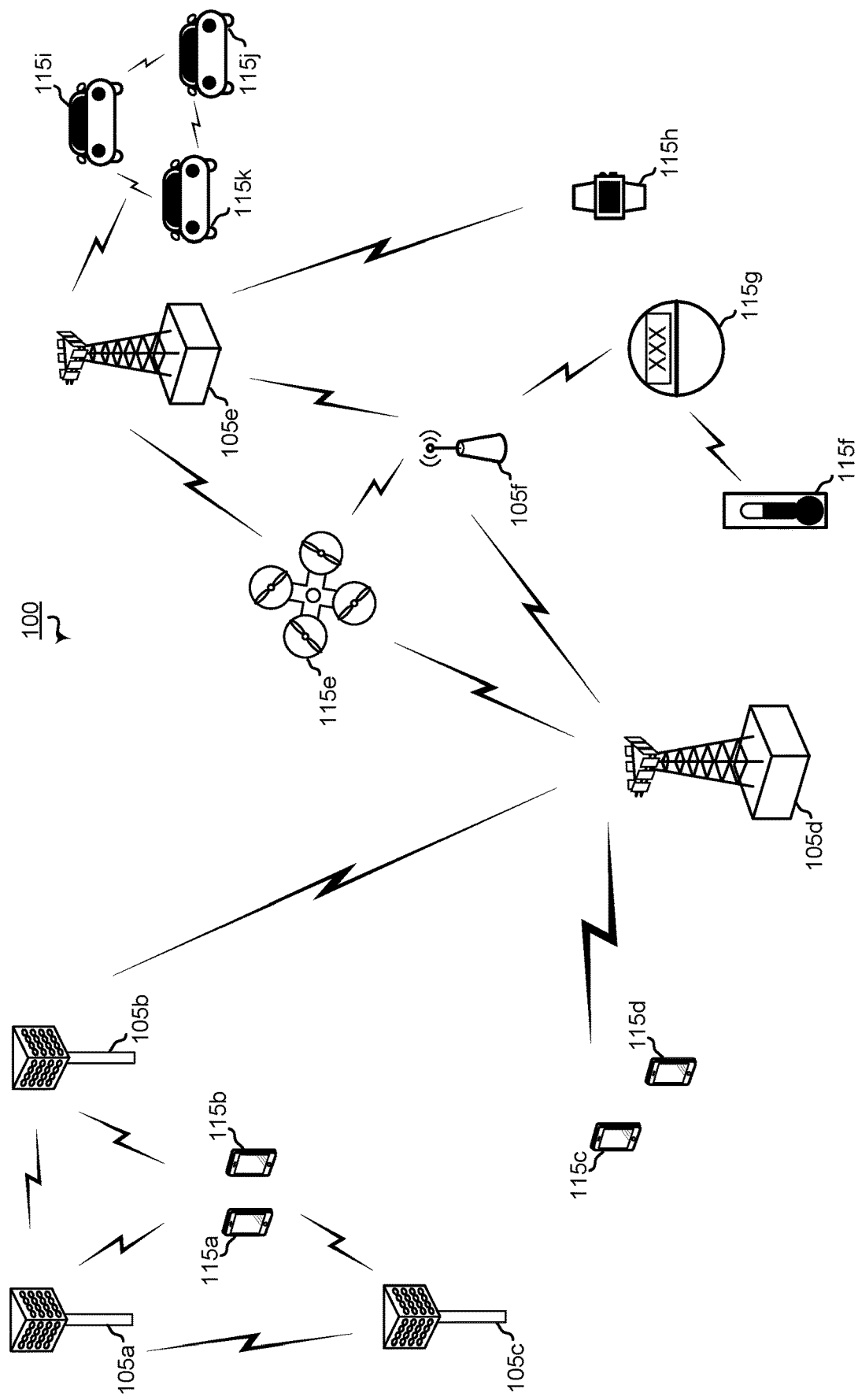
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatuses, methods, and computer-readable media to reduce false paging reception at user equipments (UEs). One technique for reducing false paging reception is to increase the number of paging radio network temporary identifiers (P-RNTIs) that are available for decoding paging downlink control information (DCI) messages. For example, a wireless communication standard (e.g., a 3rd Generation Partnership Project (3GPP) standard, as a non-limiting example) may define multiple P-RNTIs, or a network may use signaling to define multiple P-RNTIs, and different UEs may select different P-RNTIs (based on identifiers corresponding to the UEs). If a paging DCI message cannot be decoded using the selected P-RNTI, the UE may determine that the paging message is not addressed to the UE. As another example, a base station may include an indicator, such as a bitmap, in the paging DCI message, and the UEs may determine from the indicator whether or not the paging message is addressed to the UEs. As yet another example, the paging DCI message may include a resource location field that corresponds to the paging message, and the UE may determine whether or not the paging message is addressed to the UE by determining if the resource indicated in the resource location field is within the block of resources corresponding to the UE. If the paging message is not addressed to the UE, the UE does not have to receive the paging message, and false paging reception is reduced. Reducing false paging reception reduces power consumption at the UEs, because the UEs do not have to power on the one or more components (or portions thereof) to receive a paging message that is not addressed to them.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, or one or more other networks. The various different network types may use different radio access technologies (RATs) and radio access networks (RANs).

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving the UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices, purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality (AR) device, a vehicular component, a vehicular device, or a vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile phone, a cellular (cell) phone, a smart phone, a session initiation protocol (SIP) phone, a wireless local loop (WLL) station, a laptop, a personal computer (PC), a notebook, a netbook, a smart book, a tablet, gaming devices, reality modification devices (e.g., extended reality (XR), augmented reality (AR), virtual reality (VR)), entertainment devices, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented by a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or FDD communications, such as in a vehicle-to-vehicle (V2V) mesh network between UEs 115i-115k communicating with macro base station 105e.

Figure 2:
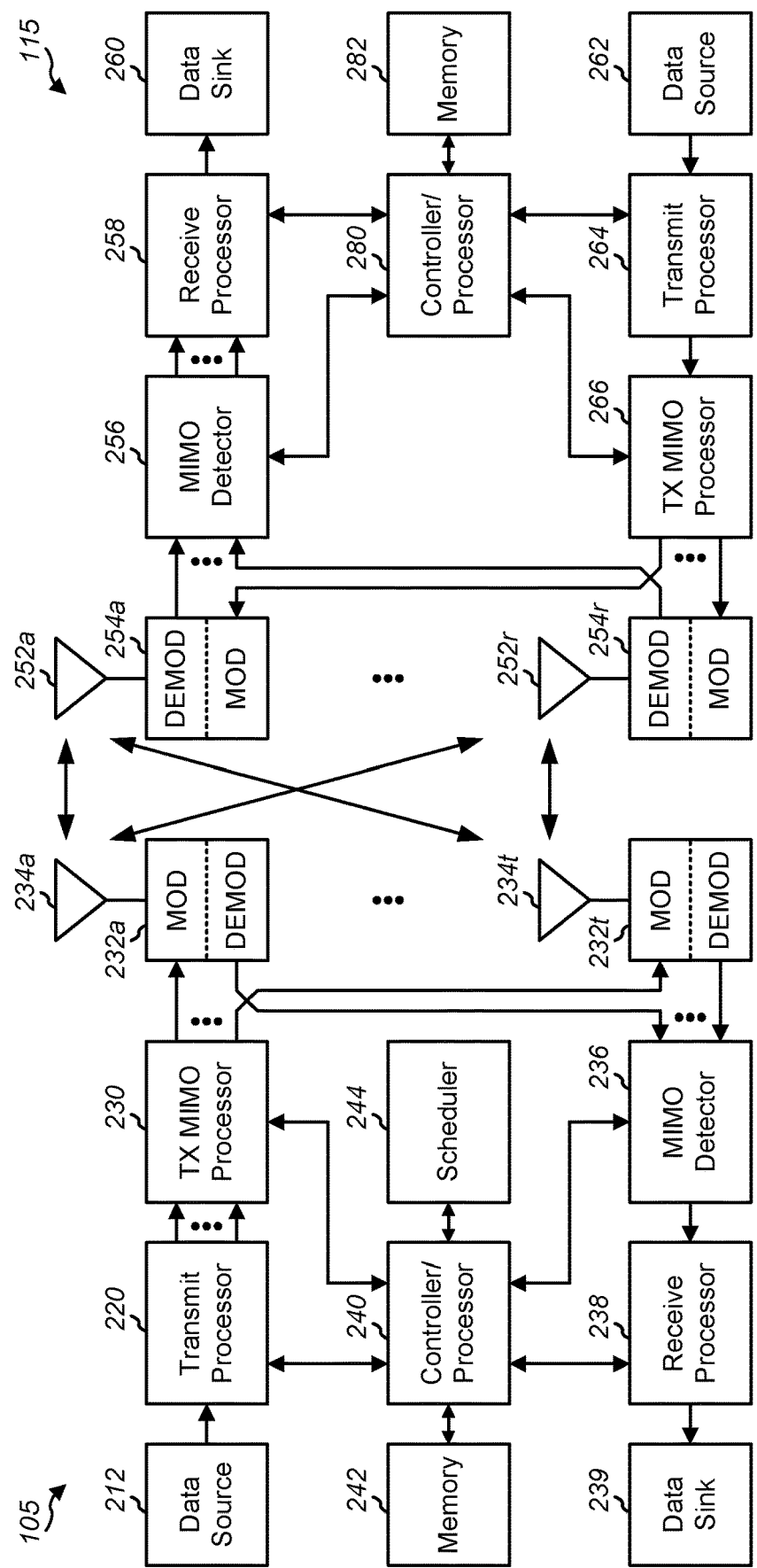
FIG. 2 is a block diagram illustrating examples of a base station and a user equipment (UE) configured according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-automatic repeat request (ARQ) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to a controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 7-12, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In some wireless communication systems, devices such as UEs may enter a radio resource control (RRC) idle/inactive mode (e.g., a low power operating mode) in order to reduce power consumption while data is not being communicated by the UEs. Each UE may "wake up" (e.g., power on one or more components) during a corresponding paging opportunity (PO) during a discontinuous reception (DRX) cycle and, if no indication of a paging message is received during the PO, the UE returns to the low power operating mode for the remainder of the DRX cycle to reduce power consumption. One technique for reducing paging load is to assign UEs to different groups, each group having its own paging opportunity. Assignment to a group is based on an identifier that uniquely identifies the UE in a wireless network and a paging frame offset.

A page typically includes two messages, a paging downlink control information (DCI) message and a paging message. The paging DCI message is transmitted over a physical downlink control channel (PDCCH) and is addressed to a paging radio network temporary identifier (P-RNTI), which is shared by all UEs in the wireless network. The paging DCI message includes the resource location of the paging message. There is no indication in the paging DCI message of which UE the paging message is addressed to, so all UEs that receive the paging DCI message power on one or more additional components (e.g., portions of modems, receivers, etc.) to receive the paging message. The paging message is transmitted via a physical downlink shared channel (PDSCH) and contains information such as identifiers of which UEs the paging message is addressed to. Thus, each UE in a PO group powers on one or more components (or portions thereof) to receive the paging message, even if some of the UEs are not recipients of the paging message. Decoding a paging message that a UE is not a recipient of (e.g., that the paging message is not addressed to) may be called a false paging reception.

Although power consumption due to false paging reception may be small in some UEs, such as typical mobile phones, in reduced-capability UEs, such as wireless sensors, power consumption due to false paging reception is more significant. Additionally, it is expected that in some 5G standards, including those related to reduced capability UEs, that paging repetition will increase significantly. Thus, power consumption due to false paging reception may become a significant problem in at least some situations.

The present disclosure provides systems, apparatuses, methods, and computer-readable media to reduce false paging reception at UEs. One technique for reducing false paging reception is to increase the number of P-RNTIs that are available for decoding paging DCI messages. For example, a wireless communication standard (e.g., a 3GPP standard, as a non-limiting example) may define multiple P-RNTIs, or a network may use signaling to define multiple P-RNTIs, and different UEs may select different P-RNTIs (based on identifiers corresponding to the UEs). If a paging DCI message cannot be decoded using the selected P-RNTI, the UE may determine that the paging message is not addressed to the UE. As another example, a base station may include an indicator, such as a bitmap, in the paging DCI message, and the UEs may determine from the indicator whether or not the paging message is addressed to the UEs. As yet another example, the paging DCI message may include a resource location field that corresponds to the paging message, and the UE may determine whether or not the paging message is addressed to the UE by determining if the resource indicated in the resource location field is within the block of resources corresponding to the UE. If the paging message is not addressed to the UE, the UE does not have to receive the paging message, and false paging reception is reduced. Reducing false paging reception reduces power consumption at the UEs, because the UEs do not have to power on the one or more components (or portions thereof) to receive a paging message that is not addressed to them.

Figure 3:
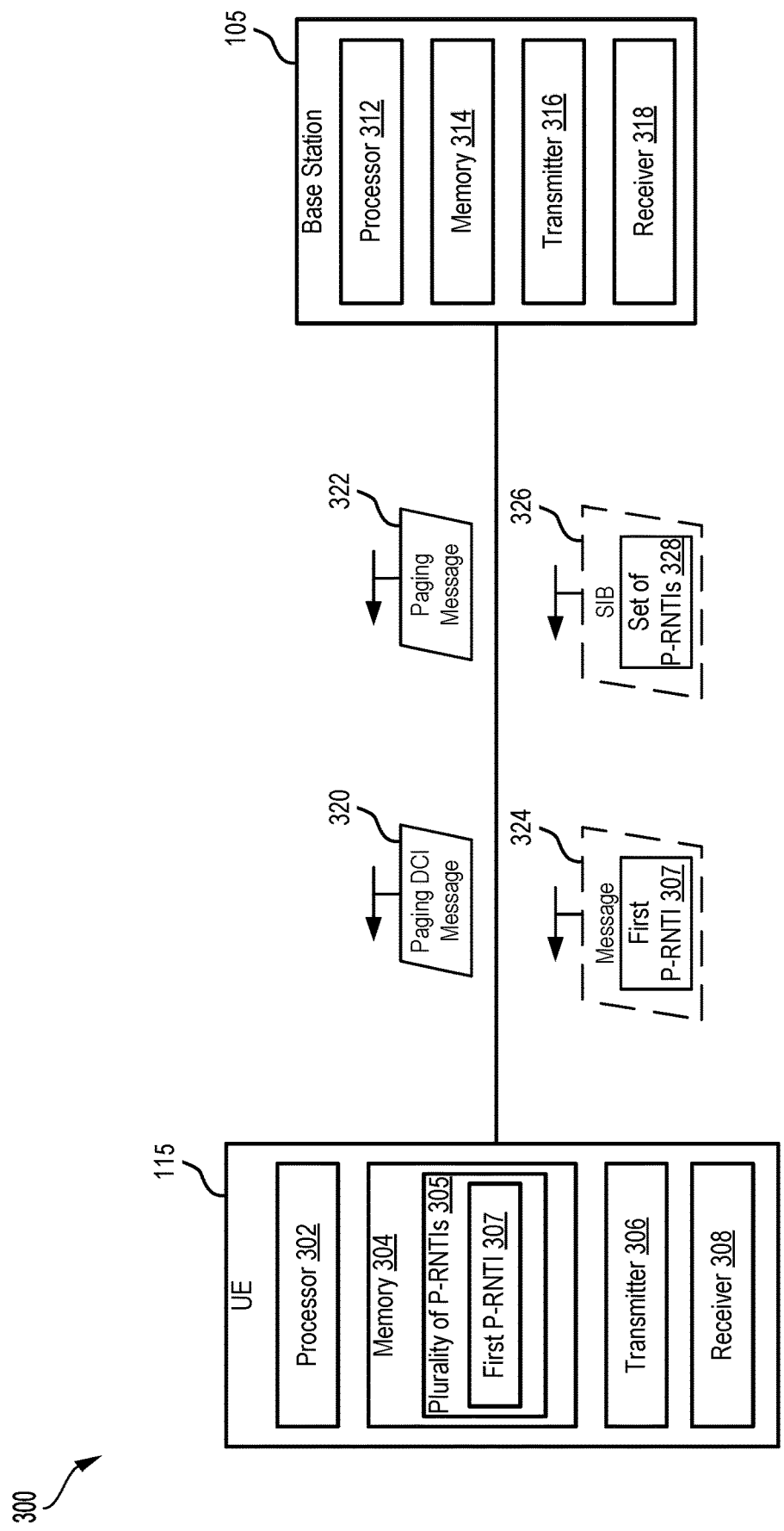
FIG. 3 is a block diagram illustrating an example of a system configured to enable use of multiple paging radio network temporary identifiers (P-RNTIs) at UE(s) according to one or more aspects.

FIG. 3 is a block diagram of an example wireless communications system 300 configured to enable use of multiple P-RNTIs at UE(s) according to one or more aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (e.g., structural, hardware components) used for carrying out one or more functions described herein. For example, these components may include a processor 302, a memory 304, a transmitter 306, and a receiver 308. Processor 302 may be configured to execute instructions stored at memory 304 to perform the operations described herein. In some implementations, processor 302 includes or corresponds to one or more of receive processor 258, transmit processor 264, and controller 280, and memory 304 includes or corresponds to memory 282.

Transmitter 306 is configured to transmit data to one or more other devices, and receiver 308 is configured to receive data from one or more other devices. For example, transmitter 306 may transmit data, and receiver 308 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 306 and receiver 308 may be replaced with a transceiver. Additionally, or alternatively, transmitter 306, receiver 308, or both may include or correspond to one or more components of UE 115 described with reference to FIG. 2.

Base station 105 may include a variety of components (e.g., structural, hardware components) used for carrying out one or more functions described herein. For example, these components may include processor 312, memory 314, transmitter 316, and receiver 318. Processor 312 may be configured to execute instructions stored at memory 314 to perform the operations described herein. In some implementations, processor 312 includes or corresponds to one or more of receive processor 238, transmit processor 220, and controller 240, and memory 314 includes or corresponds to memory 242.

Transmitter 316 is configured to transmit data to one or more other devices, and receiver 318 is configured to receive data from one or more other devices. For example, transmitter 316 may transmit data, and receiver 318 may receive data, via a network, such as a wired network, a wireless network, or a combination thereof. For example, base station 105 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 316 and receiver 318 may be replaced with a transceiver. Additionally, or alternatively, transmitter 316, receiver, 318, or both may include or correspond to one or more components of base station 105 described with reference to FIG. 2.

In some implementations, wireless communications system 300 implements a 5G NR network. For example, wireless communication system 300 may include multiple 5G-capable UEs 115 and multiple 5G-capable base stations 105 (e.g., UEs and base stations configured to operate in accordance with a 5G NR network protocol such as that defined by the 3GPP.

During operation of wireless communications system 300, a plurality of P-RNTIs 305 may be assigned to wireless communications system 300, and UE 115 may select a first P-RNTI 307 from plurality of P-RNTIs 305. Plurality of P-RNTIs 305 may be specified in a variety of ways.

In some implementations, plurality of P-RNTIs 305 are specified by a wireless communication standard, such as a 3GPP standard, as a non-limiting example. Additionally, or alternatively, plurality of P-RNTIs 305 may be preconfigured (e.g., preprogrammed) at UEs, such as UE 115, prior to release and/or deployment. Each UE in the wireless network may select its own corresponding P-RNTI from plurality of P-RNTIs 305 based on a unique identifier of the UE. For example, UE 115 may select first P-RNTI 307 based on an identifier that uniquely identifies UE 115 in the wireless network, a system frame number (SFN) or any index that identifies the radio frame associated with a paging occasion, a number of paging frames in a DRX cycle, and a number of P-RNTIs specified in the wireless communication standard and/or preconfigured at UE 115 prior to release and/or deployment. In some implementations, UE 115 selects first P-RNTI 307 according to the following equation:

$$\text{P-RNTI} = ((\text{UEID} \# \text{SFN}) \operatorname{div} N) \bmod M$$

where P-RNTI is first P-RNTI 307, UEID is the identifier of UE 115, SFN is the SFN, # is addition, subtraction, multiplication, or division, N is the number of paging frames in the DRX cycle, and M is the number of P-RNTIs included in plurality of P-RNTIs 305. Using the SFN (or any index that identifies the radio frame associated with a paging occasion) may randomize the UE's P-RNTI in each paging frame, which may further reduce false paging reception. In this manner, multiple UEs assigned to the same PO may have different P-RNTIs, which enable decoding of paging DCI messages (as further described herein).

In some other implementations, at least some of plurality of P-RNTIs 305 may be defined by the wireless network. For example, base station 105 may generate system information block (SIB) 326. SIB 326 may include a first subset of P-RNTIs 328 included in plurality of P-RNTIs 305. In some implementations, first subset of P-RNTIs 328 are cell-specific. For example, different cells may have different P-RNTIs, based on capacity, paging load, etc. In some other implementations, first subset of P-RNTIs 328 are tracking area-specific. For example, different tracking areas may have different P-RNTIs, based on capacity, paging load, etc. Base station 105 may transmit SIB 326 (including first subset of P-RNTIs 328) to UEs, such as UE 115, to inform the UEs of the available P-RNTIs, and the UEs may select a corresponding P-RNTI from first subset of P-RNTIs 328 as described above. Alternatively, plurality of P-RNTIs 305 may include both first subset of P-RNTIs 328 and a second subset of P-RNTIs. The second subset of P-RNTIs may be specified by a wireless communication standard or preconfigured (e.g., preprogrammed) at UEs, such as UE 115, before release and/or deployment. Thus, in some implementations, plurality of P-RNTIs 305 may include P-RNTIs that are specified by a wireless communication standard or preconfigured at UEs and P-RNTIs that are specified by a network. Similar to the techniques described above, UE 115 may select first P-RNTI 307 from among plurality of P-RNTIs 305 based on an identifier that uniquely identifies UE 115 in the wireless network, a SFN or any index that identifies the radio frame associated with a paging occasion, a number of paging frames in a DRX cycle, and a number of P-RNTIs in plurality of P-RNTIs 305. For example, first P-RNTI may be selected according to the following equation:

$$\text{P-RNTI} = ((\text{UEID} \# \text{SFN}) \operatorname{div} N) \bmod K,$$

where P-RNTI is first P-RNTI 307, UEID is the identifier of UE 115, SFN is the SFN, # is addition, subtraction, multiplication, or division, N is the number of paging frames in the DRX cycle, and K is the number of P-RNTIs included in plurality of P-RNTIs 305 (e.g., including first subset of P-RNTIs 328 and the second subset of P-RNTIs defined by the wireless communication standard or preconfigured at UE 115). Thus, different UEs may have different P-RNTIs, some of which are assigned by the wireless network.

In some other implementations, the network may assign a P-RNTI from plurality of P-RNTIs 305 to the UEs. For example, base station 105 may assign first P-RNTI 307 to UE 115 through dedicated signaling. To illustrate, base station 105 may generate message 324 that indicates first P-RNTI 307. Base station 105 may transmit message 324 to UE 115 to inform UE 115 of its assigned P-RNTI (e.g., first P-RNTI 307). Base station 105 may assign first P-RNTI 307 based on the equations described above or based on other factors. In some implementations, message 324 includes or corresponds to a radio resource control (RRC) release message. For example, base station 105 may transmit message 324 (e.g., the RRC release message) when UE 115 is released from an RRC connected state, and the RRC control message may identify first P-RNTI 307. In other implementations, message 324 may be other types of messages. Although each of the above-described implementations (e.g., wireless communication standard specified P-RNTIs, network specified P-RNTIs, and network assigned P-RNTIs) have been described as separate implementations, in other implementations, any combination of the above-described techniques may be used.

In addition to UE 115 selecting first P-RNTI 307, base station 105 determines whether there are any pages for any serving UEs of base station 105. For example, base station 105 may receive a message from a component of a core network to which base station 105 is connected. Based on determining that one or more UEs have a page, base station 105 generates paging DCI message 320. Paging DCI message 320 indicates resources corresponding to a paging message 322, such as a time slot, a frequency range, or both. Base station 105 encodes paging DCI message 320 based on a P-RNTI corresponding to the addressed UE of the paging message 322, and transmits the encoded paging DCI message 320 to serving UEs, including UE 115, via a PDCCH. Base station 105 also transmits paging message 322 to serving UEs via a PDSCH.

UE 115 may receive paging DCI message 320 from base station 105 during a designated PO and perform a decoding operation on paging DCI message 320 using first P-RNTI 307. If UE 115 successfully decodes paging DCI message 320, UE 115 determines that it is an intended recipient of paging message 322 and powers on one or more additional components, such a portions of processor 302, a modem, receiver 308, or other components to prepare to receive paging message 322. UE 115 then receives paging message 322 from base station 105 and processes paging message 322. If UE 115 unsuccessfully decodes paging DCI message 320, UE 115 determines that paging message 322 is not addressed to it, and UE 115 transitions to a low power operating mode (e.g., an RRC idle/inactive mode) for a remainder of a current DRX cycle.

Thus, FIG. 3 describes wireless communications system 300 that supports plurality of P-RNTIs 305 such that different UEs may use different P-RNTIs. Enabling different UEs to use different P-RNTIs enables the UEs to determine whether a paging message is addressed to them based on whether they may decode a paging DCI message. UEs that cannot decode the paging DCI message may transition into a low power state instead of receiving a paging message, which reduces power consumption at the UEs. Increasing the number of P-RNTIs used by wireless communications system 300 may decrease the likelihood of false paging reception, thereby reducing power consumption at the UEs.

Figure 4:
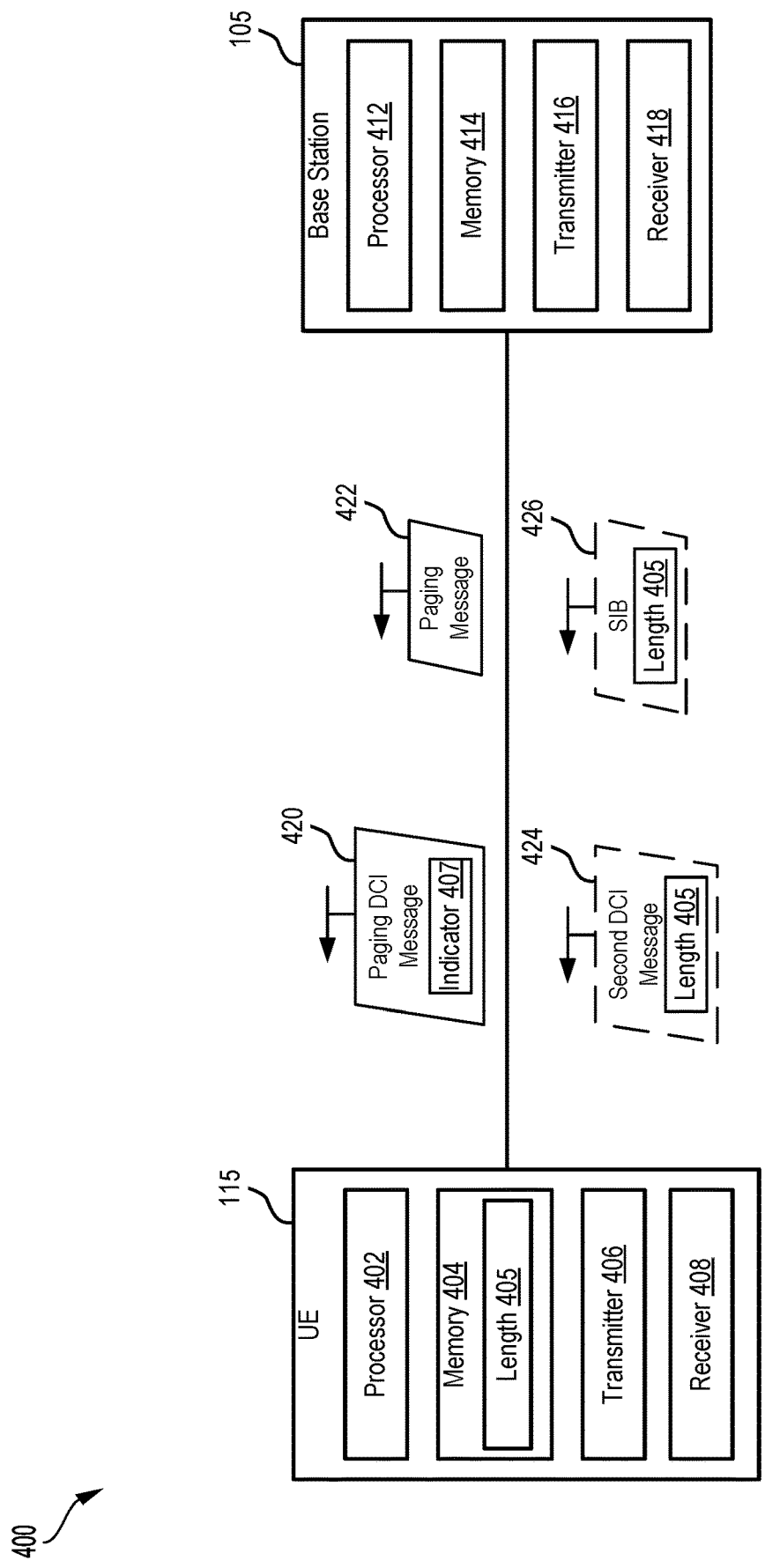
FIG. 4 is a block diagram illustrating an example of a system configured to share an indicator corresponding to a paging message according to one or more aspects.

FIG. 4 is a block diagram of an example wireless communications system 400 configured to share an indicator corresponding to a paging message. Wireless communications system 400 includes UE 115 and base station 105. UE 115 and base station 105 may include components similar to described in FIG. 3. For example, processor 402, memory 404, transmitter 406, and receiver 408 of UE 115 may include or correspond to processor 302, memory 304, transmitter 306, and receiver 308 of FIG. 3, and processor 412, memory 414, transmitter 416, and receiver 418 of base station 105 may include or correspond to processor 312, memory 314, transmitter 316, and receiver 318 of FIG. 3. Although one UE and one base station are illustrated, in other implementations, wireless communications system 400 may include more than one UE, more than one base station, or both.

During operation of wireless communications system 400, base station 105 generates a paging DCI message 420. Paging DCI message 420 includes an indicator 407 corresponding to one or more UEs and paging message 422. For example, paging DCI message 420 (e.g., indicator 407) may indicate which UEs paging message 422 is addressed to. In some implementations, indicator 407 includes or corresponds to a bitmap. In other implementations, indicator 407 includes or corresponds to another type of indicator, such as a list or a hash, a non-limiting examples. Base station 105 may set a value of each bit of the bitmap (or other indicator) to indicate whether a corresponding UE is an addressee of paging message 422. For example, if a bit corresponding to UE 115 is set to a logical '1' value, paging message 422 is addressed to UE 115. Alternatively, if the bit corresponding to UE 115 is set to a logical '0' value, paging message 422 is not addressed to UE 115. After setting the value of one or more bits, base station 105 transmits paging DCI message 420 to serving UEs, including UE 115, via a PDCCH. Base station 105 also transmits paging message 422 to serving UEs, via a PDSCH.

UE 115 receives paging DCI message 420 from base station 105 and determines whether indicator 407 corresponds to UE 115. For example, if indicator 407 is a bitmap, and a particular bit corresponding to UE 115 has a particular value (e.g., a logical '1' value), then UE 115 determines that paging message 422 is addressed to UE 115. If the particular bit corresponding to UE 115 has a different value (e.g., a logical '0' value), then UE 115 determines that paging message 422 is not addressed to UE 115.

In implementations in which indicator 407 is a bitmap, UE 115 (and base station 105) determine whether indicator 407 corresponds to UE 115 (e.g., determine which particular bit corresponds to UE 115) based on a unique identifier that uniquely identifies the UE in the wireless network, a SFN or any index that identifies the radio frame associated with a paging occasion, a length 405 of the bitmap, and a number of paging frames in a DRX cycle. For example, UE 115 may determine the particular bit (e.g., the bit that corresponds to UE 115) according to the following formula:

$$\text{index} = ((\text{UEID} \# \text{SFN}) \text{div } N) \bmod L$$

where index is an index of the particular bit of the bitmap, UEID is the unique identifier, SFN is the SFN, # is addition, subtraction, multiplication, or division, N is the number of paging frames in the DRX cycle, and L is length 405 of the bitmap. Thus, by checking the value of the particular bit in the bitmap given by the above equation, UE 115 may determine if paging message 422 is addressed to UE 115.

Although the particular bit is described as corresponding to a single UE, in other implementations, each bit of the bitmap may correspond to more than one UE (using the above equation).

In some implementations, length 405 is defined in a wireless communication standard (e.g., a 3GPP standard, as a non-limiting example). Additionally, or alternatively, length 405 may be preconfigured (e.g., preprogrammed) at UE 115 before release and/or deployment. In some other implementations, length 405 is indicated by base station 105. For example, base station 105 may generate and transmit second DCI message 424. Second DCI message 424 may include or indicate length 405. As another example, base station 105 may generate and transmit SIB 426. SIB 426 may include or indicate length 405.

If UE 115 determines that it is an intended recipient (e.g., addressee) of paging message 422, UE 115 may power on one or more components (or portions thereof) to receive paging message 422 from base station 105. Alternatively, if UE 115 determines that it is not an intended recipient (e.g., addressee) of paging message 422, UE 115 may transition into a low power operating mode for a remainder of a DRX cycle.

Thus, FIG. 4 describes wireless communications system 400 that enables sharing paging DCI message 420 that includes indicator 407 that indicates which UEs paging message 422 is addressed to. UEs that are indicated by indicator 407 (e.g., a bitmap) may power on one or more components (or portions thereof) to receive paging message 422. UEs that are not indicated by indicator 407 may transition into a low power operating mode instead of receiving paging message 422, which reduces power consumption at the UEs. In this manner, the likelihood of false paging reception is reduced.

Figure 5:
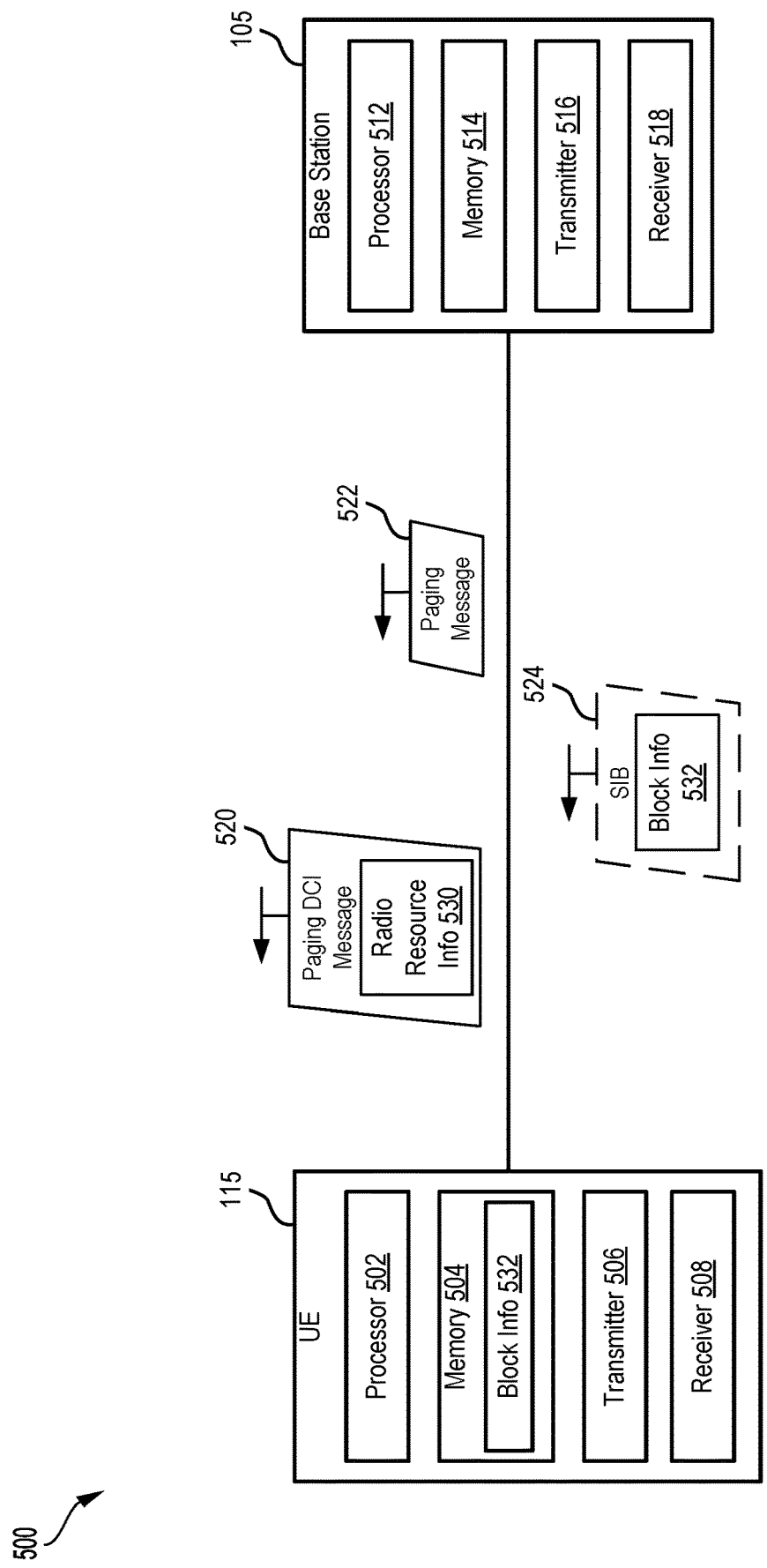
FIG. 5 is a block diagram illustrating an example of a system configured to share radio resource information corresponding to a paging message according to one or more aspects.

FIG. 5 is a block diagram of an example wireless communications system 500 configured to share radio resource information corresponding to a paging message. Wireless communications system 500 includes UE 115 and base station 105. UE 115 and base station 105 may include components similar to described in FIG. 3. For example, processor 502, memory 504, transmitter 506, and receiver 508 of UE 115 may include or correspond to processor 302, memory 304, transmitter 306, and receiver 308 of FIG. 3, and processor 512, memory 514, transmitter 516, and receiver 518 of base station 105 may include or correspond to processor 312, memory 314, transmitter 316, and receiver 318 of FIG. 3. Although one UE and one base station are illustrated, in other implementations, wireless communications system 500 may include more than one UE, more than one base station, or both.

During operation of wireless communications system 500, base station 105 generates a paging DCI message 520. Paging DCI message 520 includes radio resource information 530 that indicates a location of radio resources of paging message 522 in a time dimension, a frequency dimension, or both. For example, radio resource information 530 may indicate a time slot corresponding to paging message 522, a frequency range corresponding to paging message 522, or both. In some implementations, radio resource information 530 is indicated by a resource allocation field of paging DCI message 520. In other implementations, radio resource information 530 may be included in other fields of paging DCI message 520.

Figure 6:
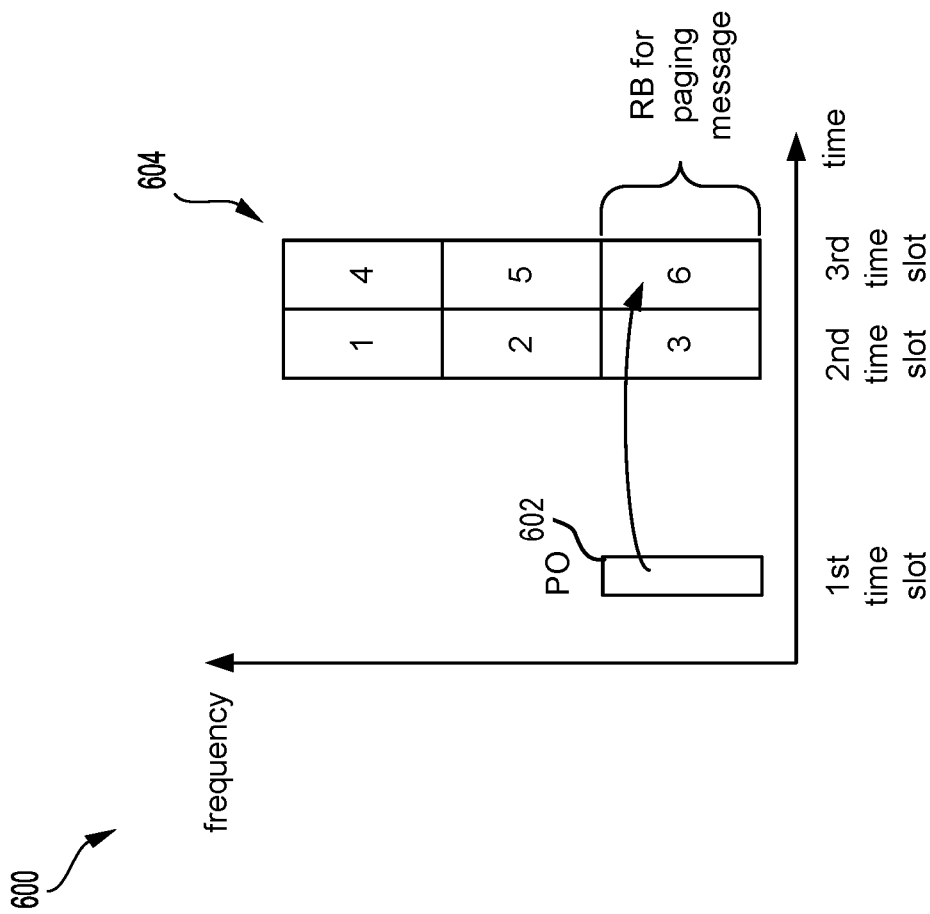
FIG. 6 is a diagram illustrating examples of a paging opportunity and resource blocks for a paging message in a time and frequency domain according to one or more aspects.

In some implementations, the radio resources in the time dimension, the frequency dimension, or both, are organized into a plurality of blocks. Each block of the plurality of blocks indicates one or more UEs to which paging message 522 is addressed. The plurality of blocks represent a division of resources of a physical downlink shared channel (PDSCH). An example of dividing time and frequency domains into resource blocks is shown in FIG. 6. As shown in FIG. 6, paging opportunity 602 ("PO") occurs during a first time slot. During paging opportunity 602, all UEs assigned to paging opportunity 602 power on sufficient components to receive paging DCI message 520. Radio resource information 530 included in paging DCI message 520 indicates which resource block of plurality of resource blocks 604 corresponds to paging message 522. For example, plurality of resource blocks 604 may include six resource blocks: resource blocks 1-3 occurring during a second time slot at different frequency ranges, and resource blocks 4-6 occurring during a third time slot at different frequency ranges. Thus, a time slot corresponding to paging DCI message 520 (e.g., a time slot corresponding to paging opportunity 602) may be different than a time slot corresponding to paging message 522. The plurality of resource blocks may be defined, as further described herein, such that the plurality of resource blocks (and their corresponding time and frequency dimensions) are known to the UEs. Radio resource information 530 indicates which resource block of plurality of resource blocks 604 that paging message 522 corresponds to (e.g., will be located in). In the example of FIG. 6, radio resource information 530 (received during paging opportunity 602) indicates that paging message 522 corresponds to (e.g., will be located within) resource block 6.

One or more UEs may correspond to each of the resource blocks of plurality of resource blocks 604, such that the UEs may determine if paging message 522 is addressed to them based on whether paging message 522 corresponds to their resource block (e.g., if the resource indicated in the resource location field of paging DCI message 520 is within the block of resources corresponding to the UE). For example, if UE 115 corresponds to resource block 6, UE 115 determines that paging message 522 is addressed to UE 115 based on paging message 522 being located in resource block 6 (e.g., in a block of resources corresponding to UE 115). If UE 115 corresponds to one of resource block 1-5, UE 115 determines that paging message 522 is not addressed to UE 115 based on paging message 522 being located in a different resource block. In this manner, UEs may determine whether or not paging message 522 is addressed to them based on whether or not paging message 522 is located in a resource block that corresponds to the UE. Although six resource blocks are illustrated in FIG. 6, in other implementations, plurality of resource blocks 604 may include fewer than six or more than six resource blocks. Additionally, or alternatively, although plurality of resource blocks 604 are shown as being defined in both the time and frequency domains, in other implementations, plurality of resource blocks 604 may be defined in only the time domain or only the frequency domain.

Returning to FIG. 5, block information 532 indicates the size and location of plurality of resource blocks 604 in the time domain, the frequency domain, or both. In some implementations, block information 532 is specified by a wireless communication standard (e.g., a 3GPP standard, as a non-limiting example) or preconfigured (e.g., preprogrammed) at UEs, such as UE 115, prior to release and/or deployment. For example, block information 532 may be stored in memory 504 prior to deployment of UE 115. In some other implementations, block information 532 is included in SIB 524 that is transmitted from base station 105 to UE 115. For example, base station 105 may determine the size and location of the resource blocks, and base station 105 may generate SIB 524 including block information 532 indicating the determined size and location of the resource blocks. Base station 105 may transmit SIB 524 to serving UEs, such as UE 115.

After receiving paging DCI message 520, UE 115 may determine whether paging message 522 is addressed to UE 115 based on radio resource information 530 and block information 532. Determining whether paging message 522 is addressed to UE 115 may be further based on an identifier that uniquely identifies UE 115 in the wireless network, a SFN or any index that identifies the radio frame associated with a paging occasion, a number of blocks in the plurality of radio resources, and a number of paging fames in a DRX cycle. For example, an index of the resource block corresponding to UE 115 may be determined according to the following equation:

$$index = ((UEID \# SFN) \text{ div } N) \bmod R,$$

where index is an index of a resource block corresponding to the UE, UEID is the identifier, SFN is the SFN, # is addition, subtraction, multiplication, or division, N is the number of paging frames in the DRX cycle, and R is the number of resource blocks in the plurality of resource blocks of radio resources. In this manner, UE 115 may determine the index of the resource block that corresponds to UE 115, and UE 115 may determine if radio resource information 530 indicates that the resource block is the location of paging message 522.

If UE 115 determines that it is an intended recipient (e.g., addressee) of paging message 522, UE 115 may power on one or more components (or portions thereof) to receive paging message 522 from base station 105. Alternatively, if UE 115 determines that it is not an intended recipient (e.g., addressee) of paging message 522, UE 115 may transition into a low power operating mode for a remainder of a DRX cycle.

Thus, FIG. 5 describes wireless communications system 500 that enables sharing paging DCI message 520 that includes radio resource information 530 that indicates which resource block paging message 522 will be located in. UEs that correspond to that resource block may determine that they are addressees (e.g., intended recipients) of paging message 522 and may power on one or more components to receive paging message 522. UEs that do not correspond to that resource block may transition into a low power state instead of receiving paging message 522, which reduces power consumption at the UEs. In this manner, the likelihood of false paging reception is reduced.

Although the implementations described with reference to FIGS. 3-5 are described separately, one or more operations or configurations described with reference to one of FIGS. 3-5 may be combined with operations or configurations described with reference to the other(s) of FIGS. 3-5 to reduce false paging, and therefore power consumption, at a UE. To illustrate, a UE (e.g., UE 115) may be configured to receive, from a base station, a paging DCI that is encoded to indicate an addressee of a paging message (as described above with reference to FIG. 3) or that indicates one or more UEs (as described above with reference to FIG. 4) or a location of radio resources of the paging message in a time dimension, a frequency dimension, or both (as described above with reference to FIG. 5). The UE may be further configured to determine whether the paging message is addressed to the UE based on an encoding of the paging DCI message (e.g., whether the UE is able to decode the paging DCI message using a P-RNTI, as described above with reference to FIG. 3), whether the one or more UEs include the UE (e.g., whether a bitmap included in the paging DCI indicates the UE is an addressee of the paging message, as described above with reference to FIG. 4), or the location of the radio resources of the paging message in the time dimension, the frequency dimension, or both (e.g., whether the location of the radio resources matches a resource block that corresponds to the UE, as described above with reference to FIG. 5). Additionally or alternatively, a base station (e.g., base station 105) may be configured to generate a paging DCI message that is encoded to indicate an addressee of a paging message (as described above with reference to FIG. 3) or that indicates one or more UEs (as described above with reference to FIG. 4) or a location of radio resources of the paging message in a time dimension, a frequency dimension, or both (as described above with reference to FIG. 5). The base station may be further configured to transmit the paging DCI message to the UE.

Figures 7, 8:
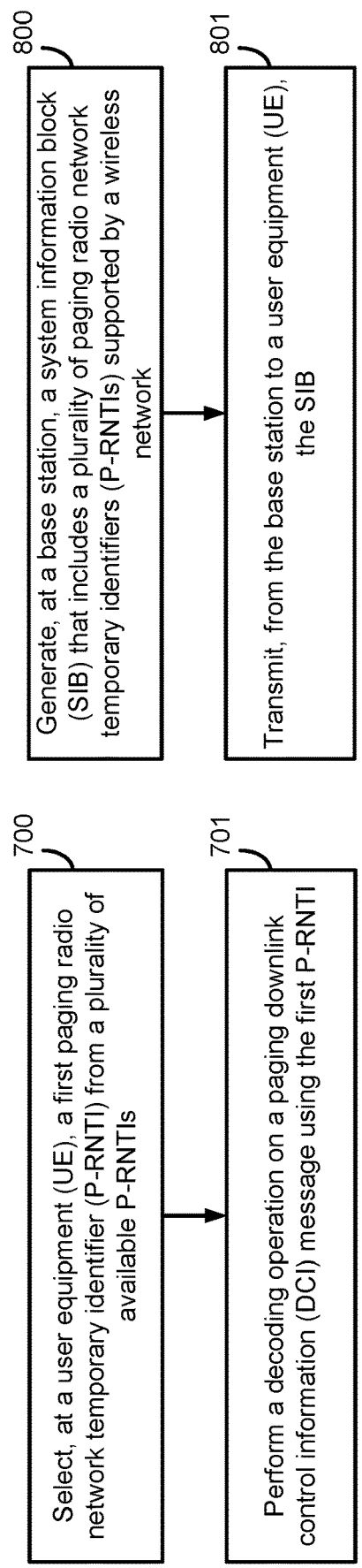
FIG. 7 is a flow diagram of an example of a method of selecting one of a plurality of P-RNTIs at a UE according to one or more aspects.
FIG. 8 is a flow diagram of an example of a method of sharing multiple P-RNTIs with a UE according to one or more aspects.
Figure 13:
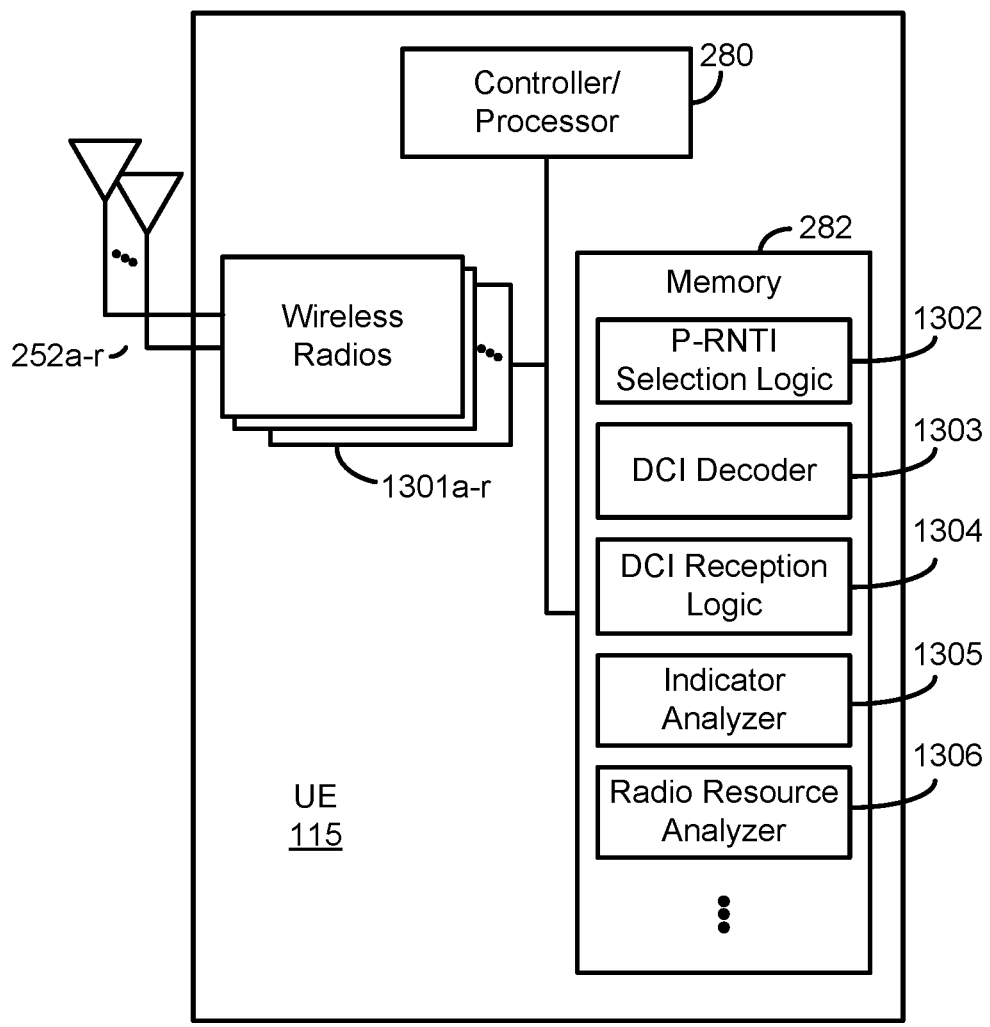
FIG. 13 is a block diagram of an example UE that supports reduced false paging according to one or more aspects.

FIG. 7 is a flow diagram illustrating example blocks executed to implement one or more aspects of the present disclosure. The example blocks will also be described with respect to UE 115 as illustrated in FIG. 13. FIG. 13 is a block diagram illustrating UE 115 configured according to one or more aspects of the present disclosure. UE 115 includes the structure, hardware, and components as illustrated for UE 115 of FIG. 2. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 1301a-r and antennas 252a-r. Wireless radios 1301a-r include various components and hardware, as illustrated in FIG. 2 for UE 115, including modulator and demodulators 254a-r, MIMO detector 256, receive processor 258, transmit processor 264, and TX MIMO processor 266.

At block 700, a UE selects a first P-RNTI from a plurality of available P-RNTIs. The UE 115 may execute, under control of controller 280, P-RNTI selection logic 1302 stored in memory 282. The execution environment of P-RNTI selection logic 1302 provides the functionality to select a first P-RNTI from a plurality of P-RNTIs.

At block 701, the UE performs a decoding operation on a paging DCI message using the first P-RNTI. The UE 115 may execute, under control of controller 280, DCI decoder 1303 stored in memory 282. The execution environment of DCI decoder 1303 provides the functionality to perform a decoding operation on a paging DCI message using the first P-RNTI. If the decoding operation is successful, UE 115 receives a paging message indicated by the paging DCI message. If the decoding is unsuccessful, UE 115 enters a low-power operating mode for a remainder of a DRX cycle.

Figure 14:
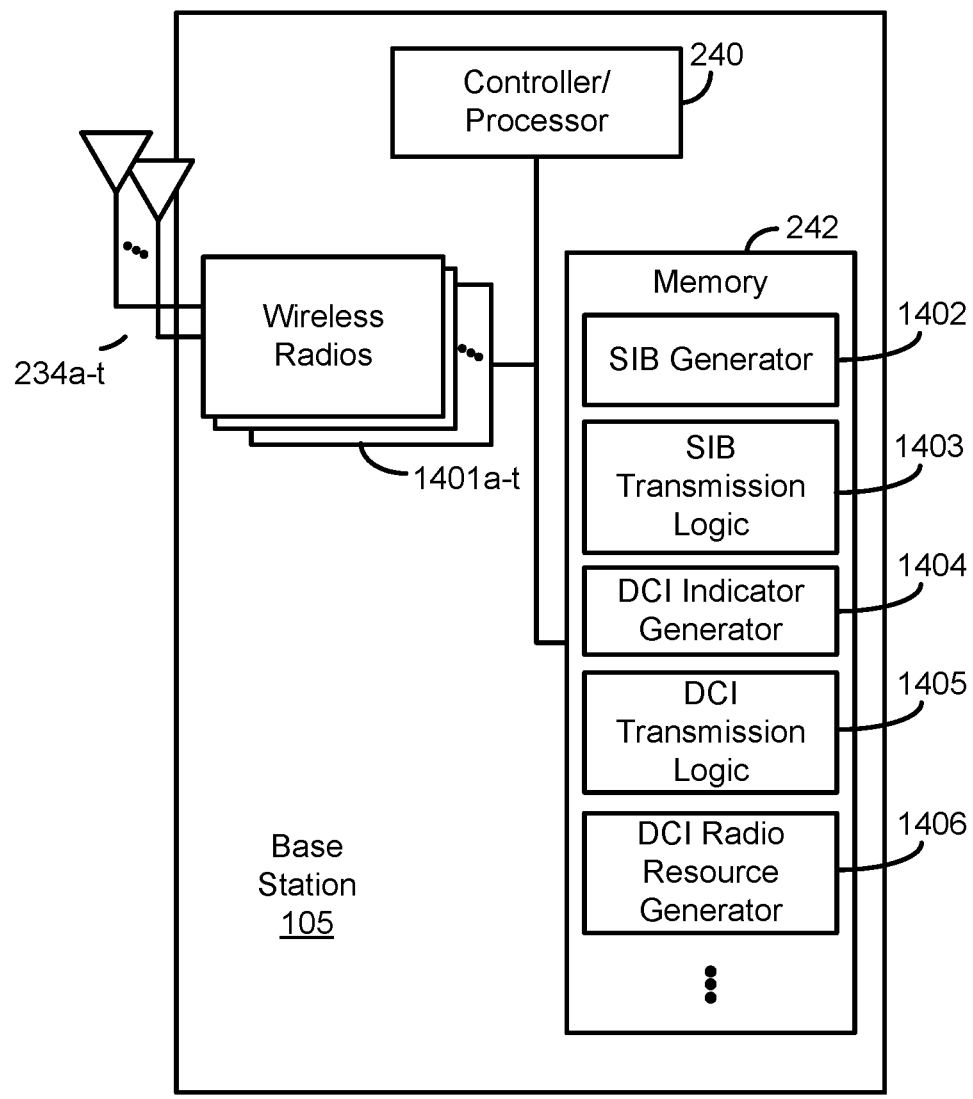
FIG. 14 is a block diagram of an example base station that supports reduced false paging at a UE according to one or more aspects.

FIG. 8 is a flow diagram illustrating example blocks executed to implement one or more aspects of the present disclosure. The example blocks will also be described with respect to base station 105 as illustrated in FIG. 14. FIG. 14 is a block diagram illustrating base station 105 configured according to one or more aspects of the present disclosure. Base station 105 includes the structure, hardware, and components as illustrated for base station 105 of FIG. 2. For example, base station 105 includes controller 240, which operates to execute logic or computer instructions stored in memory 242, as well as controlling the components of base station 105 that provide the features and functionality of base station 105. Base station 105, under control of controller 240, transmits and receives signals via wireless radios 1401a-t and antennas 234a-t. Wireless radios 1401a-t include various components and hardware, as illustrated in FIG. 2 for base station 105, including modulator and demodulators 232a-t, MIMO detector 236, receive processor 238, transmit processor 220, and TX MIMO processor 230.

At block 800, a base station generates a SIB that includes a plurality of P-RNTIs supported by a wireless network. The base station 105 may execute, under control of controller 240, SIB generator 1402 stored in memory 242. The execution environment of SIB generator 1402 provides the functionality to generate a SIB that includes a plurality of P-RNTIs supported by a wireless network.

At block 801, the base station transmits, to a UE, the SIB. The base station 105 may execute, under control of controller 240, SIB transmission logic 1403 stored in memory 242. The execution environment of SIB transmission logic 1403 provides the functionality to transmit the SIB to a UE.

Figures 9, 10:
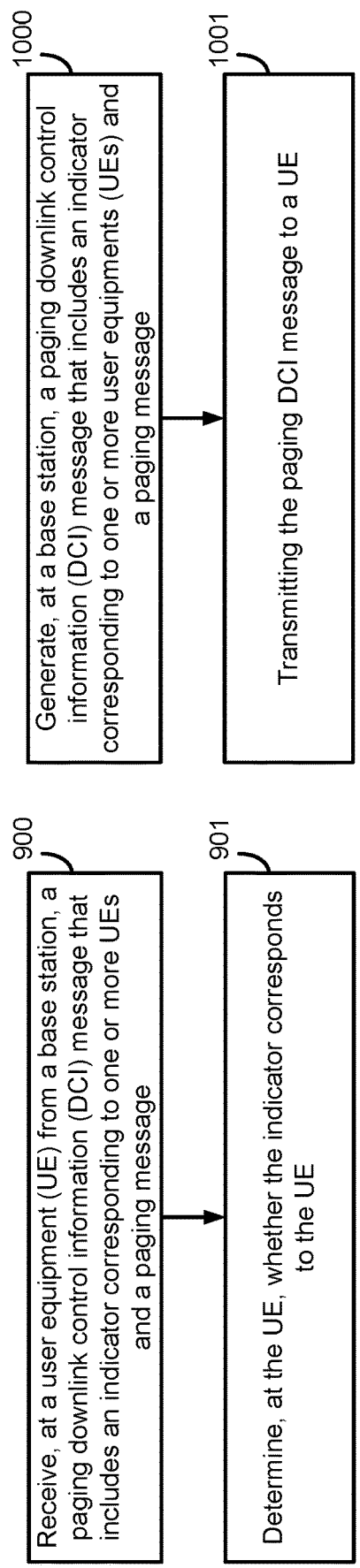
FIG. 9 is a flow diagram of an example of a method of receiving an indicator corresponding to a paging message according to one or more aspects.
FIG. 10 is a flow diagram of an example of a method of transmitting an indicator corresponding to a paging message according to one or more aspects.

FIG. 9 is a flow diagram illustrating example blocks executed to implement one or more aspects of the present disclosure. The example blocks will also be described with respect to UE 115 as illustrated in FIG. 13.

At block 900, a UE receives, from a base station, a paging DCI message that includes an indicator corresponding to one or more UEs and a paging message. The UE 115 may execute, under control of controller 280, DCI reception logic 1304 stored in memory 282. The execution environment of DCI reception logic 1304 provides the functionality to receive, from a base station, a paging DCI message. The paging DCI message may include an indicator corresponding to one or more UEs and a paging message. In some implementations, the indicator includes a bitmap.

At block 901, the UE determines whether the indicator corresponds to the UE. The UE 115 may execute, under control of controller 280, indicator analyzer 1305 stored in memory 282. The execution environment of indicator analyzer 1305 provides the functionality to determine whether the indicator corresponds to UE 115 (e.g., whether a corresponding paging message is addressed to UE 115).

FIG. 10 is a flow diagram illustrating example blocks executed to implement one or more aspects of the present disclosure. The example blocks will also be described with respect to base station 105 as illustrated in FIG. 14.

At block 1000, a base station generates a paging DCI message that includes an indicator corresponding to one or more UEs and a paging message. The base station 105 may execute, under control of controller 240, DCI indicator generator 1404 stored in memory 242. The execution environment of DCI indicator generator 1404 provides the functionality generate a paging DCI message that includes an indicator corresponding to one or more UEs and a paging message. In some implementations, the indicator includes a bitmap.

At block 1001, the base station transmits the paging DCI message to a UE. The base station 105 may execute, under control of controller 240, DCI transmission logic 1405 stored in memory 242. The execution environment of DCI transmission logic 1405 provides the functionality to transmit the paging DCI to a UE.

Figures 11, 12:
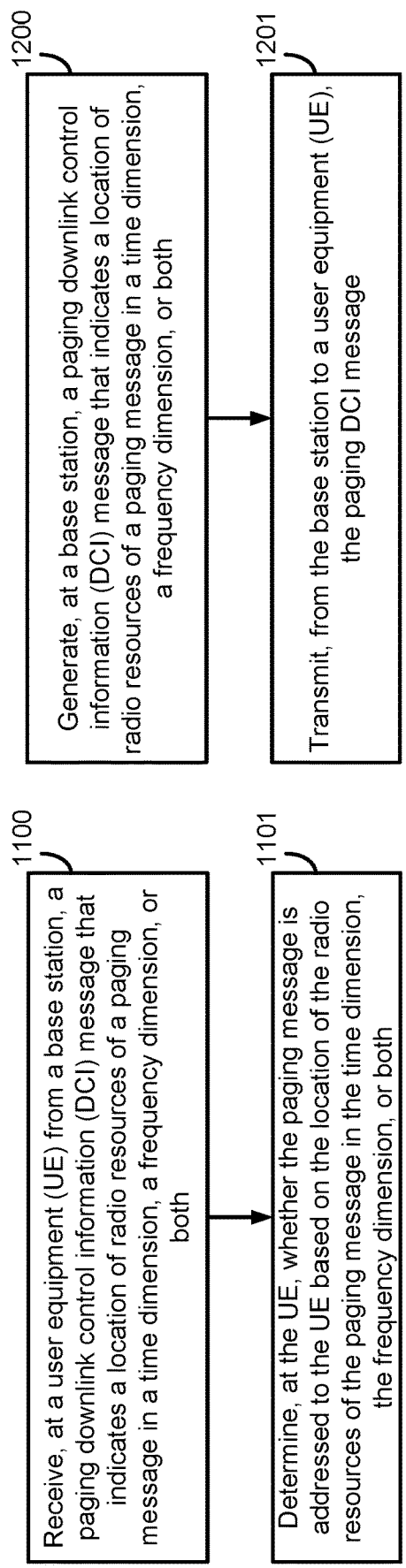
FIG. 11 is a flow diagram of an example of a method of receiving radio resource information corresponding to a paging message according to one or more aspects.
FIG. 12 is a flow diagram of an example of a method of transmitting radio resource information corresponding to a paging message according to one or more aspects.

FIG. 11 is a flow diagram illustrating example blocks executed to implement one or more aspects of the present disclosure. The example blocks will also be described with respect to UE 115 as illustrated in FIG. 13.

At block 1100, a UE receives, from a base station, a paging DCI message that indicates a location of radio resources of a paging message in a time dimension, a frequency dimension, or both. The UE 115 may execute, under control of controller 280, DCI reception logic 1304 stored in memory 282. The execution environment of DCI reception logic 1304 provides the functionality to receive, from a base station, a paging DCI message. The paging DCI message may indicate a location of radio resources of a paging message in a time dimension, a frequency dimension, or both.

At block 1101, the UE determines whether the paging message is addressed to the UE based on the location of the radio resources of the paging message in the time dimension, the frequency dimension, or both. The UE 115 may execute, under control of controller 280, radio resource analyzer 1306 stored in memory 282. The execution environment of radio resource analyzer 1306 provides the functionality to determine whether the paging message is addressed to the UE based on the location of the radio resources of the paging message in the time dimension, the frequency dimension, or both.

FIG. 12 is a flow diagram illustrating example blocks executed to implement one or more aspects of the present disclosure. The example blocks will also be described with respect to base station 105 as illustrated in FIG. 14.

At block 1200, a base station generates a paging DCI message that indicates a location of radio resources of a paging message in a time dimension, a frequency dimension, or both. The base station 105 may execute, under control of controller 240, DCI radio resource generator 1406 stored in memory 242. The execution environment of DCI radio resource generator 1406 provides the functionality to generate a paging DCI message that indicates a location of radio resources of a paging message in a time dimension, a frequency dimension, or both.

At block 1201, the base station transmits, to a UE, the paging DCI message. The base station 105 may execute, under control of controller 240, DCI transmission logic 1405 stored in memory 242. The execution environment of DCI transmission logic 1405 provides the functionality to transmit the paging DCI message to a UE.

Enabling techniques for reducing false paging reception may include additional aspects, such as any single aspect or any combination of aspects described below and/or in connection with one or more other processes described elsewhere herein. In such aspects, a UE may include at least one processor and a memory coupled to the at least one processor. The at least one processor may be configured to select a first paging radio network temporary identifier (P-RNTI) from a plurality of available P-RNTIs. The at least one processor may further be configured to perform a decoding operation on a paging downlink control information (DCI) message using the first P-RNTI. In other implementations, a non-transitory computer-readable medium may store instructions that, when executed by a processor (of a UE) cause the processor to perform the operations described herein.

In a first aspect, selecting the first P-RNTI includes receiving, from a base station, a message indicating the first P-RNTI.

In a second aspect, alone or in combination with the first aspect, the message includes a radio resource control (RRC) release message.

In a third aspect, alone or in combination with one or more of the first through third aspects, the plurality of P-RNTIs are specified by a wireless communication standard or are preconfigured at the UE prior to deployment.

In a fourth aspect, alone or in combination with the third aspect, the first P-RNTI is selected based on an identifier that uniquely identifies the UE in a wireless network, a system frame number (SFN), a number of paging frames in a discontinuous reception (DRX) cycle, and a number of P-RNTIs included in the plurality of P-RNTIs specified in the wireless communication standard or preconfigured at the UE.

In a fifth aspect, alone or in combination with the fourth aspect, the first P-RNTI is selected according to P-RNTI= ((UEID#SFN) div N) mod M, where P-RNTI is the first P-RNTI, UEID is the identifier, SFN is the SFN, # is addition, subtraction, multiplication, or division, N is the number of paging frames in the DRX cycle, and M is the number of P-RNTIs included in the plurality of P-RNTIs specified in the wireless communication standard or preconfigured at the UE.

In a sixth aspect, alone or in combination with one or more of the first through fifth aspects, the UE receives a system information block (SIB) at the UE. The SIB includes a first subset of P-RNTIs included in the plurality of P-RNTIs.

In an seventh aspect, alone or in combination with the sixth aspect, the first subset of P-RNTIs are cell-specific.

In an eighth aspect, alone or in combination with the sixth aspect, the first subset of P-RNTIs are tracking area-specific.

In a ninth aspect, alone or in combination with one or more of the sixth through eighth aspects, a second subset of P-RNTIs of the plurality of P-RNTIs are specified by a wireless communication standard or are preconfigured at the UE prior to deployment.

In a tenth aspect, alone or in combination with the ninth aspect, the first P-RNTI is selected based on an identifier that uniquely identifies the UE in a wireless network, a system frame number (SFN), a number of paging frames in a discontinuous reception (DRX) cycle, and a number of P-RNTIs included in the plurality of P-RNTIs.

In an eleventh aspect, alone or in combination with the tenth aspect, the first P-RNTI is selected according to P-RNTI=((UEID#SFN) div N) mod K, where P-RNTI is the first P-RNTI, UEID is the identifier, SFN is the SFN, # is addition, subtraction, multiplication, or division, N is the number of paging frames in the DRX cycle, and K is the number of P-RNTIs included in the plurality of P-RNTIs.

In a twelfth aspect, alone or in combination with one or more of the first through eleventh aspects, the UE, in response to successfully decoding the paging DCI message using the first P-RNTI, receives a paging message from a base station. The paging message is indicated by the paging DCI message.

In a thirteenth aspect, alone or in combination with one or more of the first through twelfth aspects, the UE, in response to unsuccessfully decoding the paging DCI message using the first P-RNTI, transitions to a low power operating mode for a remainder of a discontinuous reception (DRX) cycle.

In some aspects, a base station may include at least one processor and a memory coupled to the at least one processor. The at least one processor may be configured to generate a system information block (SIB) that includes a plurality of paging radio network temporary identifiers (P-RNTIs) supported by a wireless network. The at least one processor may further be configured to initiate transmission, to a UE, of the SIB. In other implementations, a non-transitory computer-readable medium may store instructions that, when executed by a processor (of a base station), cause the processor to perform the operations described herein.

In a fourteenth aspect, the plurality of P-RNTIs are cell-specific.

In a fifteenth aspect, alone or in combination with the fourteenth aspect, the plurality of P-RNTIs are tracking area-specific.

In a sixteenth aspect, alone or in combination with one or more of the fourteenth through fifteenth aspects, the base station, in response to a paging message being addressed to the UE, determines a P-RNTI of the plurality of P-RNTIs that corresponds to the UE, encodes a paging downlink control information (DCI) message using the P-RNTI, and transmits the encoded paging DCI to the UE.

In a seventeenth aspect, alone or in combination with the sixteenth aspect, the P-RNTI that corresponds to the UE is determined based on an identifier that uniquely identifies the UE in the wireless network, a system frame number (SFN), a number of paging frames in a discontinuous reception (DRX) cycle, and a number of P-RNTIs included in the plurality of P-RNTIs.

In some aspects, a UE may include at least one processor and a memory coupled to the at least one processor. The at least one processor may be configured to receive, from a base station, a paging downlink control information (DCI) message that includes an indicator corresponding to one or more UEs and a paging message. The at least one processor may further be configured to determine whether the indicator corresponds to the UE. In other implementations, a non-transitory computer-readable medium may store instructions that, when executed by a processor (of a UE), cause the processor to perform the operations described herein.

In an eighteenth aspect, the indicator includes a bitmap.

In a nineteenth aspect, alone or in combination with the eighteenth aspect, a length of the bitmap is defined in a wireless communication standard.

In a twentieth aspect, alone or in combination with one or more of the eighteenth through nineteenth aspects, a length of the bitmap is indicated by a second DCI message received from the base station.

In a twenty-first aspect, alone or in combination with one or more of the eighteenth through twentieth aspects, a length of the bitmap is indicated by a system information block (SIB) received from the base station.

In a twenty-second aspect, alone or in combination with one or more of the eighteenth through twenty-first aspects, determining whether the indicator corresponds to the UE includes determining whether a particular bit of the bitmap has a particular value.

In a twenty-third aspect, alone or in combination with the twenty-second aspect, the UE determines the particular bit based on a unique identifier that uniquely identifies the UE in a wireless network, a system frame number (SFN), a length of the bitmap, and a number of paging frames in a discontinuous reception (DRX) cycle.

In a twenty-fourth aspect, alone or in combination with the twenty-third aspect, the particular bit is determined according to index=((UEID#SFN) div N) mod L, where index is the particular bit of the bitmap, UEID is the unique identifier, SFN is the SFN, # is addition, subtraction, multiplication, or division, N is the number of paging frames in the DRX cycle, and L is the length of the bitmap.

In a twenty-fifth aspect, alone or in combination with one or more of the eighteenth through twenty-fourth aspects, the UE, in response to determining that the indicator corresponds to the UE, receives the paging message from the base station.

In a twenty-sixth aspect, alone or in combination with one or more of the eighteenth through twenty-fifth aspects, the UE, in response to determining that the indicator does not corresponding to the UE, transitions the UE into a low power operating mode for a remainder of a discontinuous reception (DRX) cycle.

In some aspects, a base station may include at least one processor and a memory coupled to the at least one processor. The at least one processor may be configured to generate a paging downlink control information (DCI) message that includes an indicator corresponding to one or more user equipments (UEs) and a paging message. The at least one processor may further be configured to initiate transmission of the paging DCI message to a UE. In other implementations, a non-transitory computer-readable medium may store instructions that, when executed by a processor (of a base station), cause the processor to perform the operations described herein.

In a twenty-seventh aspect, the indicator includes a bitmap.

In a twenty-eighth aspect, alone or in combination with the twenty-seventh aspect, a length of the bitmap is defined in a wireless communication standard.

In a twenty-ninth aspect, alone or in combination with one or more of the twenty-seventh through twenty-eighth aspects, the base station transmits, to the UE, a second DCI message that indicates a length of the bitmap.

In a thirtieth aspect, alone or in combination with one or more of the twenty-seventh through twenty-ninth aspects, the base station transmits, to the UE, a system information block (SIB) that indicates a length of the bitmap.

In a thirty-first aspect, alone or in combination with one or more of the twenty-seventh through thirtieth aspects, the base station sets a particular bit of the bitmap that corresponds to the UE to a particular value based on whether the paging message is addressed to the UE.

In some aspects, a UE may include at least one processor and a memory coupled to the at least one processor. The at least one processor may be configured to receive, from a base station, a paging downlink control information (DCI) message that indicates a location of radio resources of a paging message in a time dimension, a frequency dimension, or both. The at least one processor may further be configured to determine whether the paging message is addressed to the UE based on the location of the radio resources of the paging message in the time dimension, the frequency dimension, or both. In other implementations, a non-transitory computer-readable medium may store instructions that, when executed by a processor (of a UE), cause the processor to perform the operations described herein.

In a thirty-second aspect, the location of the radio resources in the time dimension, the frequency dimension, or both is indicated by a resource allocation field of the paging DCI message.

In a thirty-third aspect, alone or in combination with the thirty-second aspect, a time slot corresponding to the paging DCI message is different than a time slot corresponding to the paging message.

In a thirty-fourth aspect, alone or in combination with one or more of the thirty-second through thirty-third aspects, the radio resources in the time dimension, the frequency dimension, or both are organized by a plurality of blocks.

In a thirty-fifth aspect, alone or in combination with the thirty-fourth aspect, a size and location of each block of the plurality of blocks in the time dimension, the frequency dimension, or both are specified by a wireless communication standard or are preconfigured at the UE prior to deployment.

In a thirty-sixth aspect, alone or in combination with one or more of the thirty-fourth through thirty-fifth aspects, a size and location of each block of the plurality of blocks in the time dimension, the frequency dimension, or both are included in a system information block (SIB) received from the base station.

In a thirty-seventh aspect, alone or in combination with one or more of the thirty-fourth through thirty-sixth aspects, determining whether the paging message is addressed to the UE is further based on an identifier that uniquely identifies the UE in a wireless network, a system frame number (SFN), a number of blocks in the plurality of blocks of the radio resources, and a number of paging frames in a discontinuous reception (DRX) cycle.

In a thirty-eighth aspect, alone or in combination with the thirty-seventh aspect, whether the paging message is addressed to the UE is determined according to index= ((UEID#SFN) div N) mod R, where index is an index corresponding to the UE, UEID is the identifier, SFN is the SFN, # is addition, subtraction, multiplication, or division, N is the number of paging frames in the DRX cycle, and R is the number of blocks in the plurality of blocks of radio resources.

In a thirty-ninth aspect, alone or in combination with one or more of the thirty-second through thirty-eighth aspects, the UE, in response to determining that the paging message is addressed to the UE, receives the paging message from the base station.

In a fortieth aspect, alone or in combination with one or more of the thirty-second through thirty-ninth aspects, the UE, in response to determining that the paging message is not addressed to the UE, transitions the UE into a low power operating mode for a remainder of a discontinuous reception (DRX) cycle.

In some aspects, a base station may include at least one processor and a memory coupled to the at least one processor. The at least one processor may be configured to generate a paging downlink control information (DCI) message that indicates a location of radio resources of a paging message in a time dimension, a frequency dimension, or both. The at least one processor may further be configured to initiate transmission, to a user equipment (UE), of the paging DCI message. In other implementations, a non-transitory computer-readable medium may store instructions that, when executed by a processor (of a base station), cause the processor to perform the operations described herein.

In a forty-first aspect, the location of the radio resources in the time dimension, the frequency dimension, or both is indicated by a resource allocation field of the paging DCI message.

In a forty-second aspect, alone or in combination with the forty-first aspect, a time slot corresponding to the paging DCI message is different than a time slot corresponding to the paging message.

In a forty-third aspect, alone or in combination with one or more of the forty-first through forty-second aspects, the radio resources in the time dimension, the frequency dimension, or both are organized by a plurality of blocks.

In a forty-fourth aspect, alone or in combination with the forty-third aspect, each block of the plurality of blocks indicates one or more UEs to which the paging message is addressed.

In a forty-fifth aspect, alone or in combination with one or more of the forty-third through forty-fourth aspects, the plurality of blocks represent a division of resources of a physical downlink shared channel (PDSCH).

In some aspects, a UE may include at least one processor and a memory coupled to the at least one processor. The at least one processor may be configured to receive, from a base station, a paging downlink control information (DCI)

message. The paging DCI message is encoded to indicate an addressee of a paging message or indicates one or more UEs or a location of radio resources of the paging message in a time dimension, a frequency dimension, or both. The at least one processor may further be configured to determine whether the paging message is addressed to the UE based on: an encoding of the paging DCI message, whether the one or more UEs include the UE, or the location of the radio resources of the paging message in the time dimension, the frequency dimension, or both. In some other implementations, a non-transitory computer-readable medium may store instructions that, when executed by a processor (of a UE), cause the processor to perform the operations described herein.

In a forty-sixth aspect, the paging DCI message includes a bitmap that indicates the one or more UEs. A determination whether the paging message is addressed to the UE is based on whether the one or more UEs include the UE.

In a forty-seventh aspect, in combination with the forty-sixth aspect, a length of the bitmap is defined in a wireless communication standard.

In a forty-eighth aspect, in combination with the forty-sixth aspect, the UE receives a second DCI message from the base station. The second DCI message indicates a length of the bitmap.

In a forty-ninth aspect, in combination with the forty-sixth aspect, the UE receives a system information block (SIB) from the base station, the SIB indicating a length of the bitmap.

In a fiftieth aspect, in combination with one or more of the forty-sixth through forty-ninth aspects, determining whether the one or more UEs include the UE includes determining whether a particular bit of the bitmap has a particular value.

In a fifty-first aspect, in combination with the fiftieth aspect, the UE determines a value of the particular bit based on a unique identifier that uniquely identifies the UE in a wireless network, a system frame number (SFN), a length of the bitmap, and a number of paging frames in a discontinuous reception (DRX) cycle.

In a fifty-second aspect, in combination with the fifty-first aspect, the value of the particular bit is determined according to index=((UEID#SFN) div N) mod L. index is the particular bit of the bitmap, UEID is the unique identifier, SFN is the SFN, # is addition, subtraction, multiplication, or division, N is the number of paging frames in the DRX cycle, and L is the length of the bitmap.

In a fifty-third aspect, the UE selects a first paging radio network temporary identifier (P-RNTI) from a plurality of available P-RNTIs and performs a decoding operation on the paging DCI message using the first P-RNTI. The encoding of the paging DCI message indicates whether the paging message is addressed to the UE.

In a fifty fourth aspect, in combination with the fifty-third aspect, the UE receives, from the base station, a message indicating the first P-RNTI.

In a fifty-fifth aspect, in combination with the fifty-fourth aspect, the message includes a radio resource control (RRC) release message.

In a fifty-sixth aspect, in combination with one or more of the fifty-third through fifty-fifth aspects, the plurality of P-RNTIs are specified by a wireless communication standard or are preconfigured at the UE prior to deployment.

In a fifty-seventh aspect, in combination with the fifty-sixth aspect, the UE selects the first P-RNTI based on an identifier that uniquely identifies the UE in a wireless network, a system frame number (SFN), a number of paging frames in a discontinuous reception (DRX) cycle, and a number of P-RNTIs included in the plurality of P-RNTIs specified in the wireless communication standard or preconfigured at the UE.

In a fifty-eighth aspect, in combination with the fifty-seventh aspect, the UE selects the first P-RNTI according to P-RNTI=((UEID#SFN) div N) mod M. P-RNTI is the first P-RNTI, UEID is the identifier, SFN is the SFN, # is addition, subtraction, multiplication, or division, N is the number of paging frames in the DRX cycle, and M is the number of P-RNTIs included in the plurality of P-RNTIs specified in the wireless communication standard or preconfigured at the UE.

In a fifty-ninth aspect, in combination with one or more of the fifty-third through fifty-eighth aspects, the UE receives a system information block (SIB) from the base station. The SIB includes a first subset of P-RNTIs included in the plurality of P-RNTIs.

In a sixtieth aspect, in combination with the fifty-ninth aspect, a second subset of P-RNTIs of the plurality of P-RNTIs are specified by a wireless communication standard or are preconfigured at the UE prior to deployment.

In a sixty-first aspect, in combination with the sixtieth aspect, the UE selects the first P-RNTI according to P-RNTI=((UEID#SFN) div N) mod K. P-RNTI is the first P-RNTI, UEID is an identifier that uniquely identifies the UE in a wireless network, SFN is a system frame number (SFN), # is addition, subtraction, multiplication, or division, N is a number of paging frames in a discontinuous reception (DRX) cycle, and K is a number of P-RNTIs included in the plurality of P-RNTIs.

In a sixty-second aspect, in combination with one or more of the forty-sixth through sixty-first aspects, the UE, in response to determining that the paging message is addressed to the UE, receives the paging message from the base station.

In a sixty-third aspect, in combination with one or more of the forty-sixth through sixty-first aspects, the UE, in response to determining that the paging message is not addressed to the UE, transitions into a low power operating mode for a remainder of a discontinuous reception (DRX) cycle.

In some aspects, a base station may include at least one processor and a memory coupled to the at least one processor. The at least one processor may be configured to generate a paging downlink control information (DCI) message that is encoded to indicate an addressee of a paging message or that indicates one or more user equipments (UEs) or a location of radio resources of the paging message in a time dimension, a frequency dimension, or both. The at least one processor may further be configured to initiate transmission, to a UE, of the paging DCI message. In other implementations, a non-transitory computer-readable medium may store instructions that, when executed by a processor (of a base station), cause the processor to perform the operations described herein.

In a sixty-fourth aspect, the location of the radio resources in the time dimension, the frequency dimension, or both is indicated by a resource allocation field of the paging DCI message. The paging message is addressed to the UE based on the location of the radio resources of the paging message.

In a sixty-fifth aspect, in combination with the sixty-fourth aspect, a time slot corresponding to the paging DCI message is different than a time slot corresponding to the paging message.

In a sixty-sixth aspect, in combination with one or more of the sixty-fourth through sixty-fifth aspects, the radio resources in the time dimension, the frequency dimension, or both are organized by a plurality of blocks.

In a sixty-seventh aspect, in combination with the sixty-sixth aspect, a size and location of each block of the plurality of blocks in the time dimension, the frequency dimension, or both are specified by a wireless communication standard or are preconfigured at the base station prior to deployment.

In a sixty-eighth aspect, in combination with the sixty-sixth aspect, the base station transmits a system information block (SIB) to the UE. The SIB includes a size and location of each block of the plurality of blocks in the time dimension, the frequency dimension, or both.

In a sixty-ninth aspect, in combination with one or more of the sixty-sixth through sixty-eighth aspects, the paging message is addressed to the UE based further on an identifier that uniquely identifies the UE in a wireless network, a system frame number (SFN), a number of blocks in the plurality of blocks of the radio resources, and a number of paging frames in a discontinuous reception (DRX) cycle.

In a seventieth aspect, in combination with the sixty-ninth aspect, the base station addresses the paging message to the UE according to index=((UEID#SFN) div N) mod R. index is an index corresponding to the UE, UEID is the identifier, SFN is the SFN, # is addition, subtraction, multiplication, or division, N is the number of paging frames in the DRX cycle, and R is the number of blocks in the plurality of blocks of radio resources.

In a seventy-first aspect, the paging DCI message includes a bitmap that indicates the one or more UEs. The base station sets a particular bit of the bitmap that corresponds to the UE to a particular value to address the paging message to the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-14 may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, and/or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication performed by a user equipment (UE), the method comprising:
   receiving, from a network entity, a paging downlink control information (DCI) message that indicates a location of radio resources of a paging message; and
   determining whether the paging message is addressed to the UE based on the location of the radio resources of the paging message, wherein the location of the radio resources corresponds to a location, in a time domain and in a frequency domain, of one or more resource blocks within a plurality of resource blocks, each resource block of the plurality of resource blocks assigned to one or more UEs based on predefined resource block assignments.

2. The method of claim 1, further comprising receiving a second paging DCI message, wherein the second paging DCI message includes a bitmap that indicates the one or more UEs, and wherein a determination of whether a second paging message is addressed to the UE is based on whether the one or more UEs include the UE.

3. The method of claim 2, further comprising receiving a third paging DCI message from the network entity, the third paging DCI message indicating a length of the bitmap; and wherein:
   a length of the bitmap is defined in a wireless communication standard; and
   the paging DCI message indicate the location of the radio resources of the paging message in a time dimension, a frequency dimension, or both.

4. The method of claim 2, further comprising receiving a system information block (SIB) from the network entity, the SIB indicating a length of the bitmap.

5. The method of claim 2, wherein determining whether the one or more UEs include the UE comprises determining whether a particular bit of the bitmap has a particular value.

6. The method of claim 2, further comprising determining a value of a particular bit of the bitmap based on a unique identifier that uniquely identifies the UE in a wireless network, a system frame number (SFN), a length of the bitmap, and a number of paging frames in a discontinuous reception (DRX) cycle.

7. The method of claim 1, further comprising addressing the paging message to the UE according to:

index=((UEID#SFN)div N)mod L, wherein index is a particular bit of a bitmap that indicates the one or more UE and that is included in a second paging DCI message, UEID is a unique identifier corresponding to the UE, SFN is a system frame number (SFN), # is addition, subtraction, multiplication, or division, N is a number of paging frames in a discontinuous reception (DRX) cycle, and L is a length of the bitmap.

8. The method of claim 1, further comprising, in response to determining that the paging message is addressed to the UE, receiving the paging message from the network entity.

9. The method of claim 1, further comprising, in response to determining that the paging message is not addressed to the UE, transitioning the UE into a low power operating mode for a remainder of a discontinuous reception (DRX) cycle.

10. The method of claim 1, further comprises determining, by the UE, that the paging message is addressed to the UE based on the one or more resource blocks being assigned to the UE in the predefined resource block assignments.

11. The method of claim 1, further comprising:
based on a result a mod X operation performed on a mathematical combination an identifier that uniquely identifies the UE in a wireless network, a system frame number (SFN), and a number of paging frames in a discontinuous reception (DRX) cycle:
addressing the paging message to the UE according to an index corresponding to the UE, the index is based on the result, and wherein X is:
the number of resource blocks in the plurality of resource blocks of the radio resources, or
a length of a bitmap included in a second paging DCI message, the bitmap indicates the one or more UEs; or
selecting a first paging radio network temporary identifier paging radio network temporary identifier (P-RNTI) from among a plurality of P-RNTIs to decode a second paging DCI message that is encoded to indicate whether a second paging message is addressed to the UE, the first P-RNTI is based on the result, and wherein X is the number of P-RNTIs included in the plurality of P-RNTIs.

12. The method of claim 11, wherein the number of P-RNTIs included in the plurality of P-RNTIs:
is specified in a wireless communication standard,
is preconfigured at the UE, or
includes a first subset of P-RNTIs included in a system information block (SIB) and a second subset of P-RNTIs of the plurality of P-RNTIs are specified by the wireless communication standard or are preconfigured at the UE.

13. The method of claim 1, further comprising addressing the paging message to the UE according to an index corresponding to the UE, the index determined based on an identifier that uniquely identifies the UE in a wireless network, a system frame number (SFN), a number of paging frames in a discontinuous reception (DRX) cycle, and the number of resource blocks in the plurality of resource blocks of the radio resources.

14. A user equipment (UE) configured for wireless communication, the UE comprising:
at least one processor; and
a memory coupled to the at least one processor,
wherein the at least one processor is configured to:
receive, from a network entity, a paging downlink control information (DCI) message, wherein the paging DCI message indicates a location of radio resources of a paging message; and
determine whether the paging message is addressed to the UE based on the location of the radio resources of the paging message, wherein the location of the radio resources corresponds to a location, in a time domain and in a frequency domain, of one or more resource blocks within a plurality of resource blocks, each resource block of the plurality of resource blocks assigned to one or more user equipments (UEs) based on predefined resource block assignments.

15. The UE of claim 14, wherein the at least one processor is further configured to:
select a first paging radio network temporary identifier (P-RNTI) from a plurality of available P-RNTIs; and
perform a decoding operation on a second paging DCI message using the first P-RNTI, wherein encoding of the second paging DCI message indicates whether a second paging message is addressed to the UE.

16. The UE of claim 15, wherein the at least one processor is further configured to receive, from the network entity, a message indicating the first P-RNTI.

17. The UE of claim 16, wherein the message comprises a radio resource control (RRC) release message.

18. The UE of claim 15, wherein:
the plurality of P-RNTIs are specified by a wireless communication standard or are preconfigured at the UE prior to deployment, and
the at least one processor is further configured to select the first P-RNTI based on an identifier that uniquely identifies the UE in a wireless network, a system frame number (SFN), a number of paging frames in a discontinuous reception (DRX) cycle, and a number of P-RNTIs included in the plurality of P-RNTIs specified in the wireless communication standard or preconfigured at the UE.

19. The UE of claim 15, wherein the at least one processor is further configured to select the first P-RNTI according to:

P-RNTI=((UEID#SFN)div N)mod M, wherein P-RNTI is the first P-RNTI, UEID is an identifier that uniquely identifies the UE in a wireless network, SFN is a system frame number (SFN), # is addition, subtraction, multiplication, or division, N is a number of paging frames in a discontinuous reception (DRX) cycle, and M is the number of P-RNTIs included in the plurality of P-RNTIs.

20. The UE of claim 15, wherein the at least one processor is further configured to receive a system information block (SIB) from the network entity, and wherein the SIB includes a first subset of P-RNTIs included in the plurality of P-RNTIs.

21. The UE of claim 20, wherein a second subset of P-RNTIs of the plurality of P-RNTIs are specified by a wireless communication standard or are preconfigured at the UE prior to deployment.

22. The UE of claim 21, wherein the at least one processor is further configured to select the first P-RNTI according to:

P-RNTI=((UEID#SFN)div N)mod K, wherein P-RNTI is the first P-RNTI, UEID is an identifier that uniquely identifies the UE in a wireless network, SFN is a system frame number (SFN), # is addition, subtraction, multiplication, or division, N is a number of paging frames in a discontinuous reception (DRX) cycle, and K is a number of P-RNTIs included in the plurality of P-RNTIs.

23. A method of wireless communication performed by a network entity, the method comprising:

generating a paging downlink control information (DCI) message that indicates a location of radio resources of a paging message, wherein the location of the radio resources corresponds to a location, in a time domain and in a frequency domain, of one or more resource blocks within a plurality of resource blocks, each resource block of the plurality of resource blocks assigned to one or more UEs based on predefined resource block assignments; and transmitting, to a user equipment (UE), the paging DCI message.

24. The method of claim 23, wherein the paging message is addressed to the UE based on the one or more resource blocks being assigned to the UE in the predefined resource block assignments.

25. The method of claim 24, wherein a time slot corresponding to the paging DCI message is different than a time slot corresponding to the paging message.

26. The method of claim 24, wherein a size and location of each resource block of the plurality of resource blocks in a time dimension, a frequency dimension, or both and the predefined resource block assignments are specified by a wireless communication standard or are preconfigured at the network entity prior to deployment.

27. The method of claim 24, further comprising transmitting a system information block (SIB) to the UE, the SIB including a size and location of each resource block of the plurality of resource blocks in a time dimension, a frequency dimension, or both.

28. The method of claim 23, wherein the paging message is addressed to the UE based further on an identifier that uniquely identifies the UE in a wireless network, a system frame number (SFN), a number of resource blocks in the plurality of resource blocks of the radio resources, and a number of paging frames in a discontinuous reception (DRX) cycle.

29. The method of claim 23, further comprising addressing the paging message to the UE according to:

$$index = ((UEID \# SFN) \text{ div } N) \bmod R,$$

wherein index is an index corresponding to the UE, UEID is an identifier that uniquely identifies the UE in a wireless network, SFN is a system frame number (SFN), # is addition, subtraction, multiplication, or division, N is a number of paging frames in a discontinuous reception (DRX) cycle, and R is the number of resource blocks in the plurality of resource blocks of the radio resources.

30. An apparatus configured for wireless communication, the apparatus comprising:

at least one processor; and a memory coupled to the at least one processor, wherein the at least one processor is configured to:

generate, at a network entity, a paging downlink control information (DCI) message indicates a location of radio resources of a paging message, wherein the location of the radio resources corresponds to a location, in a time domain and in a frequency domain, of one or more resource blocks within a plurality of resource blocks, each resource block of the plurality of resource blocks assigned to one or more UEs based on predefined resource block assignments; and initiate transmission, from the network entity to a user equipment (UE), of the paging DCI message.

* * * * *